US007368837B2

(12) United States Patent
Miyamoto et al.

(10) Patent No.: US 7,368,837 B2
(45) Date of Patent: May 6, 2008

(54) DRIVE GUIDE DEVICE

(75) Inventors: Taro Miyamoto, Tokyo (JP); Toshiyuki Aso, Tokyo (JP); Shuhei Yamanaka, Tokyo (JP); Wataru Nakayama, Tokyo (JP)

(73) Assignee: THK Co., Ltd., Tokyo (JP)

( * ) Notice: Subject to any disclaimer, the term of this patent is extended or adjusted under 35 U.S.C. 154(b) by 107 days.

(21) Appl. No.: 10/518,081

(22) PCT Filed: Jun. 27, 2003

(86) PCT No.: PCT/JP03/08172

§ 371 (c)(1),
(2), (4) Date: Dec. 16, 2004

(87) PCT Pub. No.: WO2004/004100

PCT Pub. Date: Jan. 8, 2004

(65) Prior Publication Data
US 2005/0258688 A1 Nov. 24, 2005

(30) Foreign Application Priority Data
Jul. 1, 2002 (JP) ............................ 2002-192566
Sep. 27, 2002 (JP) ............................ 2002-284140

(51) Int. Cl.
*H02K 41/00* (2006.01)
(52) U.S. Cl. .......................................... 310/12; 310/64
(58) Field of Classification Search ............ 310/12–13, 310/15–16, 64; 355/30, 53, 72, 75
See application file for complete search history.

(56) References Cited

U.S. PATENT DOCUMENTS 4,916,340 A * 4/1990 Negishi ........................ 310/12

5,357,158 A * 10/1994 Takei ........................... 310/12
5,850,112 A * 12/1998 Sienz et al. .................. 310/12

(Continued)

FOREIGN PATENT DOCUMENTS

JP         6-041381         5/1994

(Continued)

OTHER PUBLICATIONS

Translation of the International Preliminary Report on Patentability of International Application No. PCT/JP 2003/008172, with Form PCT/IB/338.

*Primary Examiner*—Thanh Lam
(74) *Attorney, Agent, or Firm*—Westerman, Hattori, Daniels & Adrian, LLP.

(57) ABSTRACT

The present invention provides a drive guide apparatus capable of ensuring an increased lifetime by preventing heat generated from a primary side of a linear motor from being transferred to a rail or a moving member of a guide mechanism to which the primary side of the linear motor is connected, thereby preventing variation of rolling resistance or sliding resistance of the guide mechanism. The drive guide apparatus has a linear motor and a guide mechanism that has a rail and a moving member provided to be movable relative to the rail. A primary side of the linear motor is connected to the rail. Thermal for blocking heat generated from the primary side of the linear motor are provided between the primary side and the rail of the guide mechanism to which the primary side is connected directly or indirectly.

2 Claims, 27 Drawing Sheets

U.S. PATENT DOCUMENTS 5,998,889 A * 12/1999 Novak ................... 310/12
6,825,583 B2 * 11/2004 Joung et al. ............ 310/16
6,977,450 B2 * 12/2005 Asou et al. ............. 310/12

FOREIGN PATENT DOCUMENTS

| | | |
|---|---|---|
| JP | 7-106053 | 11/1995 |
| JP | 9-19129 | 1/1997 |
| JP | 2661092 | 6/1997 |
| JP | 2000-114034 | 4/2000 |
| JP | 2001-99151 | 4/2001 |
| JP | 2001-169529 | 6/2001 |
| JP | 2001-327152 | 11/2001 |

* cited by examiner

DRIVE GUIDE DEVICE

TECHNICAL FIELD

The present invention relates to a drive guide apparatus that has a guide mechanism including a rail and a moving member provided to be movable relative to the rail and that uses a linear motor as a driving means.

BACKGROUND ART

Conventional drive guide apparatuses of this type are disclosed in Japanese Patent Post-Exam Publication No. Hei 7-106053 and Japanese Patent Application Unexamined Publication (KOKAI) No. 2001-99151. FIG. 1 is a diagram showing schematically the arrangement of a conventional drive guide apparatus of the type described above.

In the figure, a linear motor 100 comprises a primary side 101 and a secondary side 102. The primary side 101 is an energized side including armature coils. The secondary side 102 is a non-energized side having magnets, etc. The primary side 101 is connected through a table 103 to moving blocks 105 each serving as a moving member of a guide mechanism 104. The secondary side 102 of the linear motor 100 is secured to a base 106. The base 106 is secured to the top of a surface plate 107.

The base 106 is provided thereon with two parallel rails 108 constituting the guide mechanism in combination with the moving blocks 105. The moving blocks 105 move along the rails 108 in response to driving force obtained from the linear motor 100.

The rails 108 are each formed with a plurality of rolling element rolling surfaces extending longitudinally, as will be detailed later. The moving blocks 105 are each formed with endless recirculation passages including load rolling element rolling passages corresponding to the rolling element rolling surfaces. When the moving blocks 105 move along the rails 108, a plurality of rolling elements arranged and accommodated in the endless recirculation passages roll and recirculate while receiving a load in the load rolling element rolling passages.

In the drive guide apparatus arranged as stated above, the table 103 secured to the moving blocks 105 to extend therebetween is provided with the primary side 101 of the linear motor 100, which is the energized side including armature coils. Therefore, when a driving electric current is passed through the armature coils (not shown) of the primary side 101, heat generated from the primary side 101 is transferred to the table 103, causing the table 103 and the moving blocks 105 to be heated to expand. Consequently, stress due to the thermal expansion of the table 103 and the moving blocks 105 is applied to the moving blocks 105.

The rolling elements arranged and accommodated in the endless recirculation passages of the moving blocks 105 constituting the guide mechanism 104 have been given a predetermined preload. More specifically, rolling elements having a diameter slightly larger than the diameter of the load rolling element rolling passages are inserted into the rolling passages, thereby producing a negative clearance, i.e. causing the rolling elements and the rolling surfaces to be elastically deformed.

When stress due to thermal expansion is applied to the moving blocks 105 as stated above, the preload is varied. That is, the preload increases at one side and decreases or becomes zero at the other side. The increase in the preload involves the problem that the rolling resistance to the rolling elements increases, leading to shortening of the lifetime of the drive guide apparatus.

Here, let us explain the preload. The preload is applied in order to ensure a predetermined rigidity adequate for each particular purpose. In apparatus that are required to exhibit high accuracy, e.g. precision measuring apparatus, a light preload necessary for removing play is applied because the apparatus cannot perform the desired function if there is play. In machine tools or the like, an intermediate preload is applied in order to ensure the required rigidity because a cutting operation and the like cannot be performed unless the rigidity is sufficiently high.

It should be noted that rigidity includes static rigidity and dynamic rigidity. Static rigidity is the ability to resist a static load, i.e. a displacement of the moving block relative to the mounting reference plane. Dynamic rigidity is performance required for machine tools, for example, which is expressed by the reciprocal ratio of the deflection width of a time-varying displacement to the deflection width of a time-varying load. In short, dynamic rigidity is the ability to minimize external vibration transmission. That is, insufficient dynamic rigidity of a machine tool, for example, causes chatter during cutting or other machining process and leads to a problem that the machine tool is readily affected by external vibration.

The above-described conventional example has a rolling guide arrangement in which the moving blocks 105 each serving as a moving member are engaged with the rails 108 through rolling elements. It should be noted, however, that the above-described problems also occur in the case of employing a slide guide arrangement in which rolling elements are not interposed between a rail and a moving member. In this case also, the lifetime of the guide apparatus is shortened.

In the rolling guide, an increase in rolling resistance gives rise to a problem. In the case of slide guide, an increase in sliding resistance becomes a problem.

The present invention was made in view of the above-described circumstances. An object of the present invention is to provide a drive guide apparatus capable of ensuring an increased lifetime by preventing heat generated from a primary side of a linear motor from being transferred to a rail or a moving member of a guide mechanism to which the primary side of the linear motor is connected, thereby preventing variation of rolling resistance of the guide mechanism (when arranged in the form of a rolling guide) or sliding resistance of the guide mechanism (when arranged in the form of a slide guide).

DISCLOSURE OF THE INVENTION

To attain the above-described object, the present invention provides a drive guide apparatus having a linear motor and a guide mechanism that guides relative movement between a primary side of the linear motor, which is an energized side thereof, and a secondary side of the linear motor, which is a non-energized side thereof, and that carries a load. The guide mechanism has a rail and a moving member provided to be movable relative to the rail. The primary side of the linear motor is connected directly or indirectly to the rail or the moving member of the guide mechanism. Thermal insulating means for blocking heat generated from the primary side of the linear motor is provided between the primary side of the linear motor and the rail or the moving member of the guide mechanism to which the primary side of the linear motor is connected.

As stated above, thermal insulating means for blocking heat generated from the primary side of the linear motor is provided between the primary side of the linear motor and the rail or the moving member of the guide mechanism to which the primary side of the linear motor is connected directly or indirectly. Therefore, the heat transfer cutoff action of the thermal insulating means prevents heat generated from the primary side of the linear motor from being transferred to the rail or the moving member of the guide mechanism. Consequently, thermal expansion of the rail or the moving member is prevented, and there is no variation in rolling resistance or sliding resistance of the guide mechanism. Accordingly, it is possible to ensure an increased lifetime for the drive guide apparatus.

In the drive guide apparatus, the thermal insulating means may comprise a thermal insulator interposed between the rail or the moving member and the primary side of the linear motor.

If the thermal insulating means comprises a thermal insulator interposed between the rail or the moving member and the primary side of the linear motor, as stated above, an increased lifetime can be ensured for the drive guide apparatus with a simple arrangement.

In the drive guide apparatus, the thermal insulator may be elongated in the direction of relative movement between the rail and the moving member.

If the thermal insulator is elongated in the direction of relative movement between the rail and the moving member, as stated above, rigidity in this direction increases. Thus, undesired oscillation phenomena can be prevented.

In the drive guide apparatus, the thermal insulating means may comprise a thermal insulating space formed between the rail or the moving member and the primary side of the linear motor.

If the thermal insulating means comprises a thermal insulating space formed between the rail or the moving member and the primary side of the linear motor, as stated above, it is possible to cut off the transfer of radiation heat from the primary side of the linear motor. Therefore, it is possible to prevent thermal expansion of the rail or the moving member due to radiation heat and hence possible to eliminate variation in rolling resistance or sliding resistance of the guide mechanism. Accordingly, an increased lifetime can be ensured for the drive guide apparatus as in the case of the above.

In the drive guide apparatus, the thermal insulating space may have a mirror finished surface at a side thereof closer to the rail or the moving member of the guide mechanism to which the primary side of the linear motor is connected.

If the thermal insulating space has a mirror finished surface at a side thereof closer to the rail or the moving member of the guide mechanism to which the primary side of the linear motor is connected, as stated above, the transfer of radiation heat from the primary side of the linear motor can be cut off even more effectively.

The drive guide apparatus may also be arranged as follows. The rail is formed with a rolling element rolling surface extending longitudinally of the rail. The moving member has an endless recirculation passage including a load rolling element rolling passage corresponding to the rolling element rolling surface. A multiplicity of rolling elements are arranged and accommodated in the endless recirculation passage. The rolling elements recirculate through the endless recirculation passage while receiving a load in the load rolling element rolling passage.

With the above-described arrangement, the preload applied to the rolling elements is not varied by a stress generated by thermal expansion of the rail or the moving member. Accordingly, smooth rolling of the rolling elements is ensured, so that an increased lifetime of the drive guide apparatus is attained. In the rolling guide, if the preload increases, flaking (a phenomenon in which the surface of the raceway surface or the rolling element surface peels off in flakes owing to the rolling fatigue of the material) is likely to occur. If flaking occurs, the lifetime reduces markedly. In the slide guide, such a flaking problem is unlikely to occur.

The drive guide apparatus may be provided with a heatsink that dissipates heat generated from the primary side of the linear motor.

If a heatsink is provided to dissipate heat generated from the primary side of the linear motor, as stated above, heat generated from the primary side of the linear motor can be dissipated efficiently. Therefore, the transfer of the heat to the rail or the moving member of the guide mechanism is further retarded. As a result, restrictions on the linear motor configuration for heat dissipation are reduced. Accordingly, it is possible to employ a linear motor having an arrangement even more suitable for the drive guide apparatus.

In the drive guide apparatus, the heatsink may be a finned heatsink having radiating fins.

If a finned heatsink having radiating fins is used, as stated above, the heat dissipation effect is further enhanced. Accordingly, the transfer of heat to the rail or the moving member of the guide mechanism is further retarded.

In addition, the present invention provides a drive guide apparatus having a linear motor and a guide mechanism that guides relative movement between a primary side of the linear motor, which is an energized side thereof, and a secondary side of the linear motor, which is a non-energized side thereof, and that carries a load. The guide mechanism has a rail and a moving member provided to be movable relative to the rail. The primary side of the linear motor is connected to the moving member through a heatsink, and an absorbing member is provided at the joint between the primary side of the linear motor and the moving member. The absorbing member absorbs a deformation of the heatsink due to a thermal expansion difference between the moving member and the heatsink by shearing force deformation.

In the above-described arrangement, a deformation absorbing member is provided at the joint between the moving member and the heatsink. Thus, when the heatsink is thermally expanded and deformed by heat from the primary side of the linear motor, shearing force acts on the absorbing member. Consequently, the absorbing member is shear-deformed to absorb the deformation of the heatsink. Therefore, no stress is applied to the heatsink, and hence the heatsink is not deformed. There is also no displacement of the primary side of the linear motor that is attached to the heatsink. Accordingly, there is no change in the gap between the primary side and the secondary side of the linear motor. Hence, there is no change in characteristics of the linear motor.

In the drive guide apparatus, the absorbing member may have both the function of absorbing a deformation of the heatsink by shear deformation and the thermal insulating function of cutting off the heat transfer from the heatsink to the moving member.

With the above-described arrangement, the absorbing member has both the function of absorbing a deformation of the heatsink by shear deformation and the thermal insulating function of cutting off the heat transfer from the heatsink to the moving member. Therefore, no influence is exerted upon the characteristics of the linear motor as stated above.

Moreover, there is no variation in rolling resistance or sliding resistance of the guide mechanism.

In the drive guide apparatus, the absorbing member may be a laminated glass-epoxy resin material.

If a laminated glass-epoxy resin material is used for the absorbing member, as stated above, a deformation of the heatsink is absorbed easily. That is, the laminated glass-epoxy resin material exhibits strong rigidity in the lamination direction (thickness direction) and weak rigidity in a direction (width direction) perpendicular to the lamination direction. Therefore, when the heatsink thermally expands in response to a rise in temperature, shearing force acts on the absorbing member. At this time, the absorbing member is easily deformed to absorb the deformation of the heatsink.

BEST MODE FOR CARRYING OUT THE INVENTION

Figure 1:
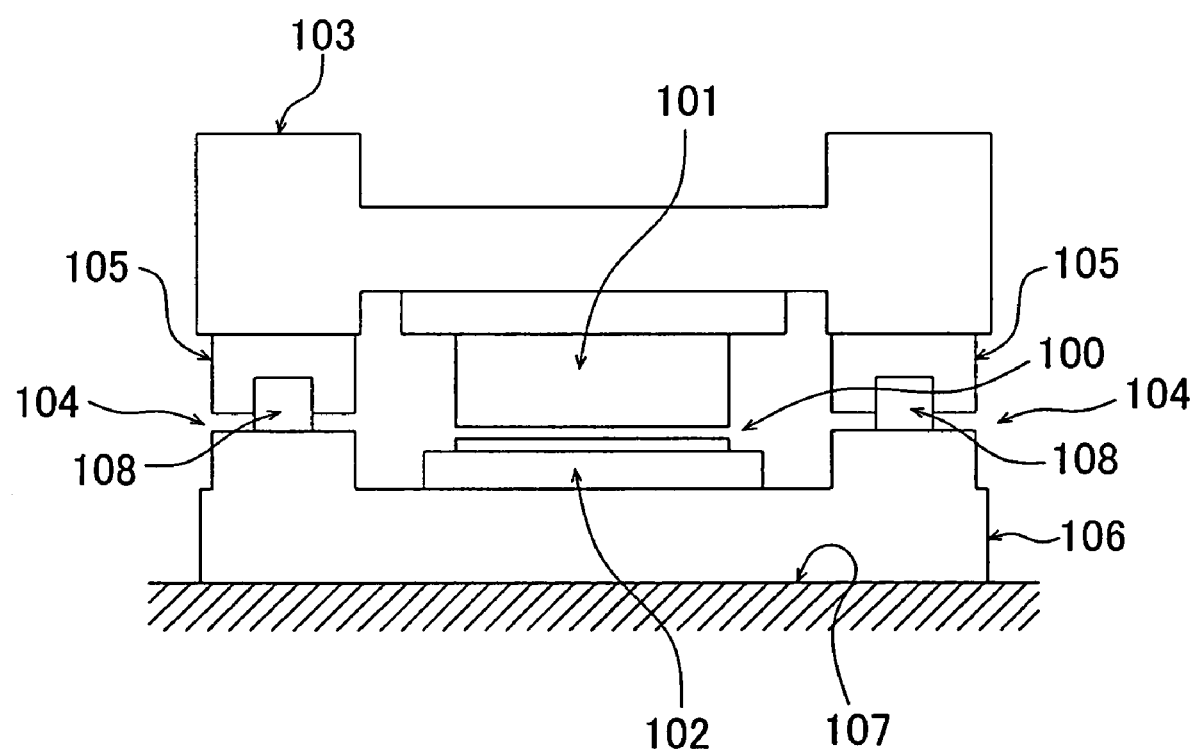
FIG. 1 is a diagram showing schematically the arrangement of a conventional drive guide apparatus.
Figure 2:
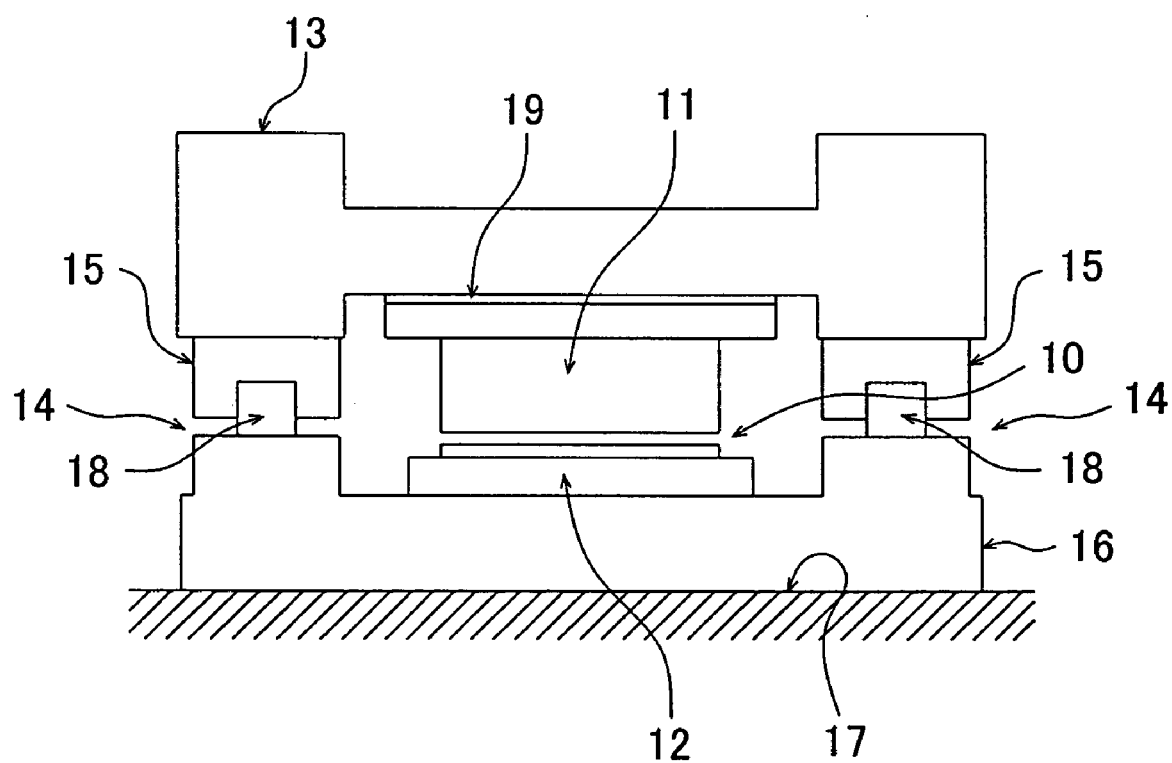
FIG. 2 is a diagram showing schematically a structural example of the drive guide apparatus according to the present invention.

FIG. 2 is a diagram showing schematically a structural example of a first embodiment of the drive guide apparatus according to the present invention. In the figure, a linear motor 10 comprises a primary side 11 and a secondary side 12. The primary side 11 is an energized side including armature coils. The secondary side 12 is a non-energized side having magnets, etc. The primary side 11 is connected through a table 13 to moving blocks 15 each serving as a moving member of a guide mechanism 14. The secondary side 12 of the linear motor 10 is secured to a base 16. The base 16 is secured to the top of a surface plate 17. In this regard, the drive guide apparatus according to the present invention is the same as the conventional example shown in FIG. 1.

The base 16 is provided thereon with two parallel rails 18 constituting the guide mechanism in combination with the moving blocks 15. The moving blocks 15 move along the rails 18 in response to driving force obtained from the linear motor 10. In this regard also, the drive guide apparatus according to the present invention is the same as the conventional example shown in FIG. 1.

The drive guide apparatus according to the present invention differs from the drive guide apparatus shown in FIG. 1 in that a thermal insulator 19 is provided between the primary side 11 of the linear motor 10 and the table 13 to prevent heat generated from the primary side 11 from being transferred to the table 13. As a material for the thermal insulator 19, a glass-filled epoxy resin material, a ceramic material, etc. are usable.

With the above-described arrangement in which the thermal insulator 19 is provided between the primary side 11 of the linear motor 10 and the table 13, heat generated from the armature coils (not shown) of the primary side 11 when a driving electric current is passed therethrough is prevented from being transferred to the table 13 or the moving blocks 15. Therefore, thermal expansion of the table 13 or the moving blocks 15 does not occur.

Accordingly, there is no variation in preload (contact pressure) applied to a plurality of rolling elements, e.g. balls, arranged and accommodated in the endless recirculation passages of the moving blocks 15 of the guide mechanism 14, and the rolling resistance can be kept constant. Therefore, an increased lifetime can be ensured for the drive guide apparatus.

Figure 3:
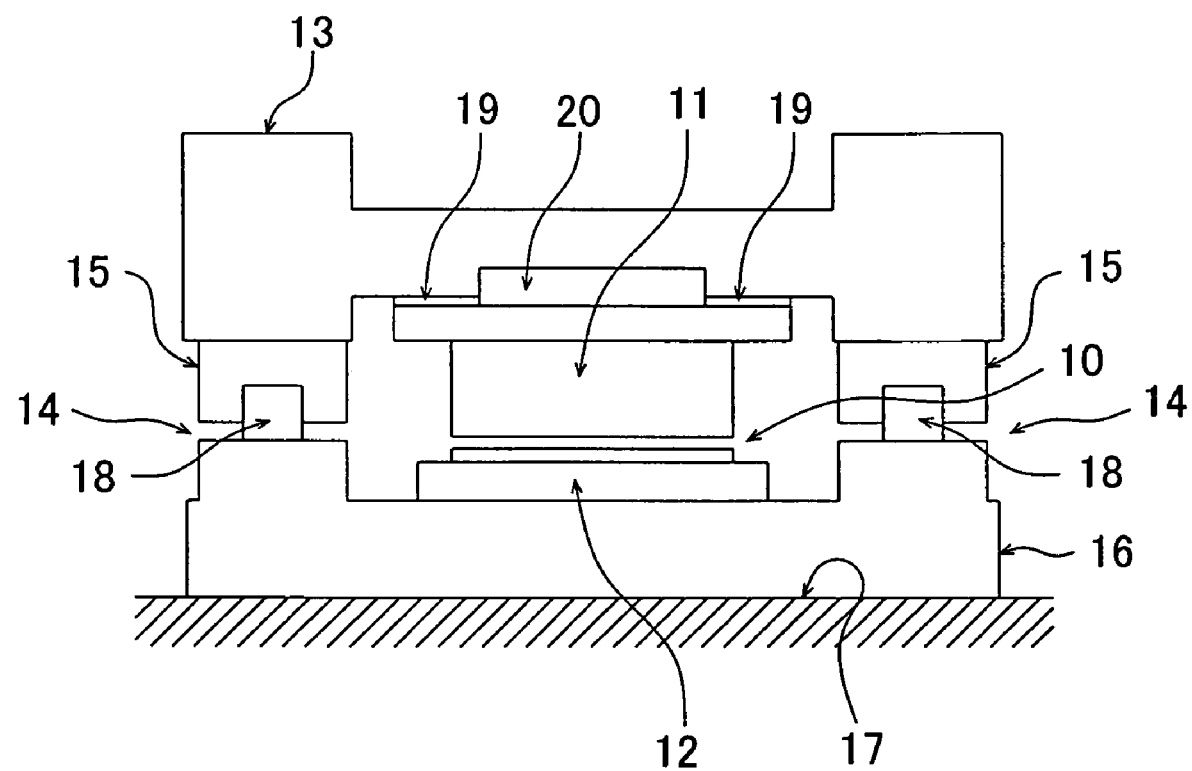
FIG. 3 is a diagram showing schematically a structural example of the drive guide apparatus according to the present invention.

In the drive guide apparatus arranged as stated above, the thermal insulator 19 is provided over the whole surface of the primary side 11 of the linear motor 10, by way of example. However, the arrangement may be such that the thermal insulator 19 is not provided over the whole surface of the primary side 11 but positioned at a predetermined region on each side of the primary side 11 in such a manner as to extend longitudinally of the rails 18 as shown, for example, in FIG. 3.

If a recess 20 acting as a thermal insulating space is provided on the lower side of the table 13 at a position between the thermal insulators 19, it becomes possible to cut off the transfer of radiation heat from the primary side 11.

In the above-described example, both the thermal insulator 19 and the recess 20 serving as a thermal insulating space are provided. By doing so, the thermal insulating effect is improved more than in the case of employing either of them. However, the required thermal insulating effect can be ensured by using only either of them.

If the surface of the table 13 that faces the recess 20 serving as a thermal insulating space (i.e. the inner surface of the recess 20) is formed into a mirror finished surface, the transfer of radiation heat can be cut off even more effectively. It should be noted that the mirror finished surface is obtained by electroless nickel plating, polishing, etc.

In addition, if the thermal insulator 19 is elongated in the longitudinal direction of the rails 18, that is, in the direction of movement of the table 13 (moving blocks 15), rigidity in this direction increases. Thus, undesired oscillation phenomena can be prevented.

Figure 4:
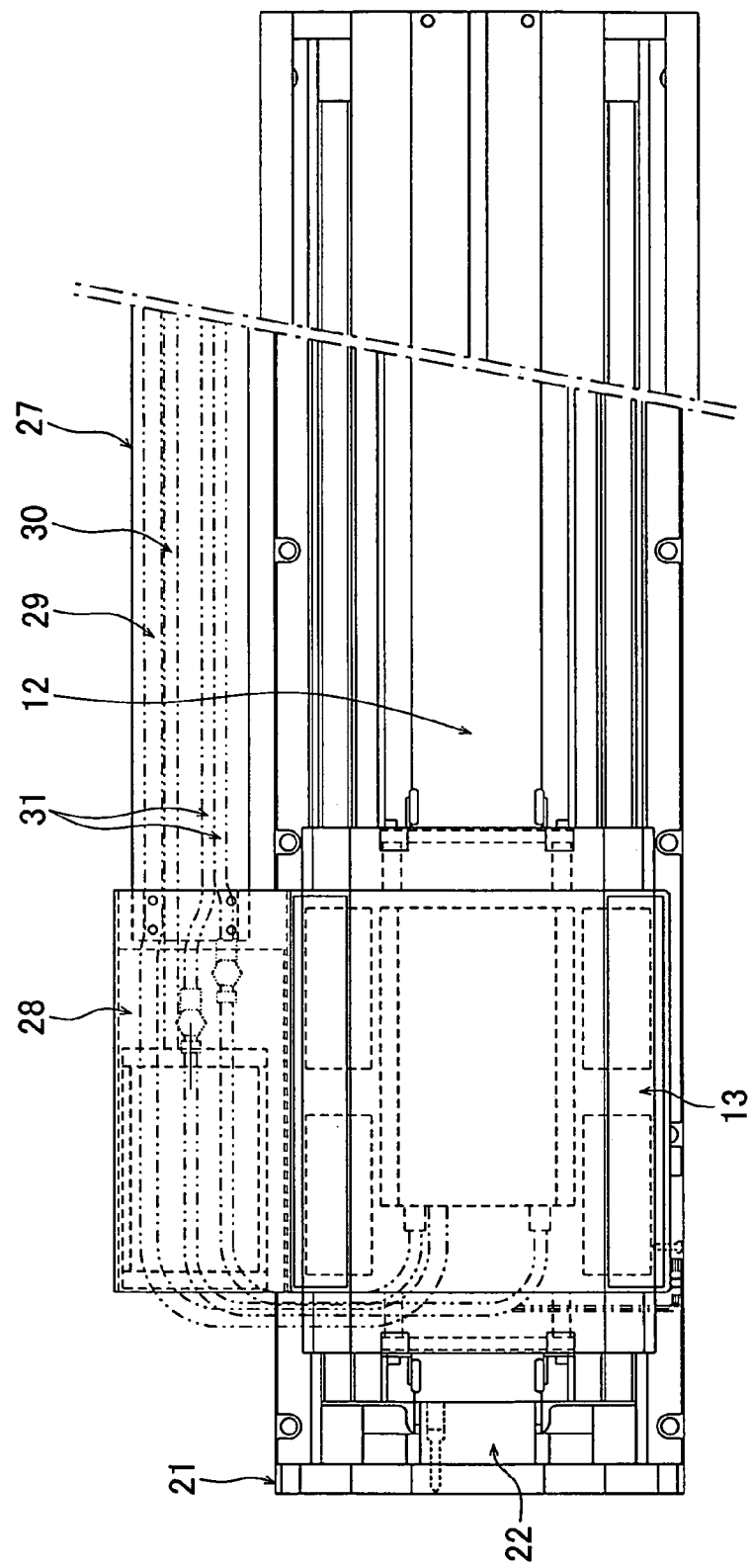
FIG. 4 is a plan view showing a structural example of the drive guide apparatus according to the present invention.
Figure 5:
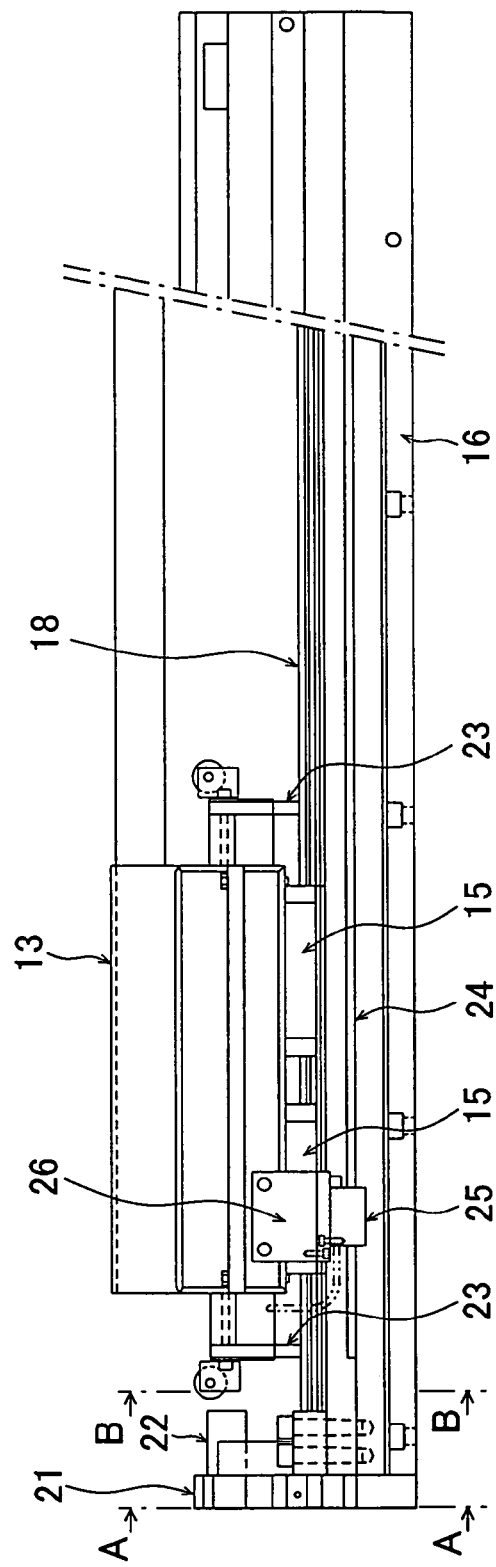
FIG. 5 is a side view showing a structural example of the drive guide apparatus according to the present invention.
Figure 6:
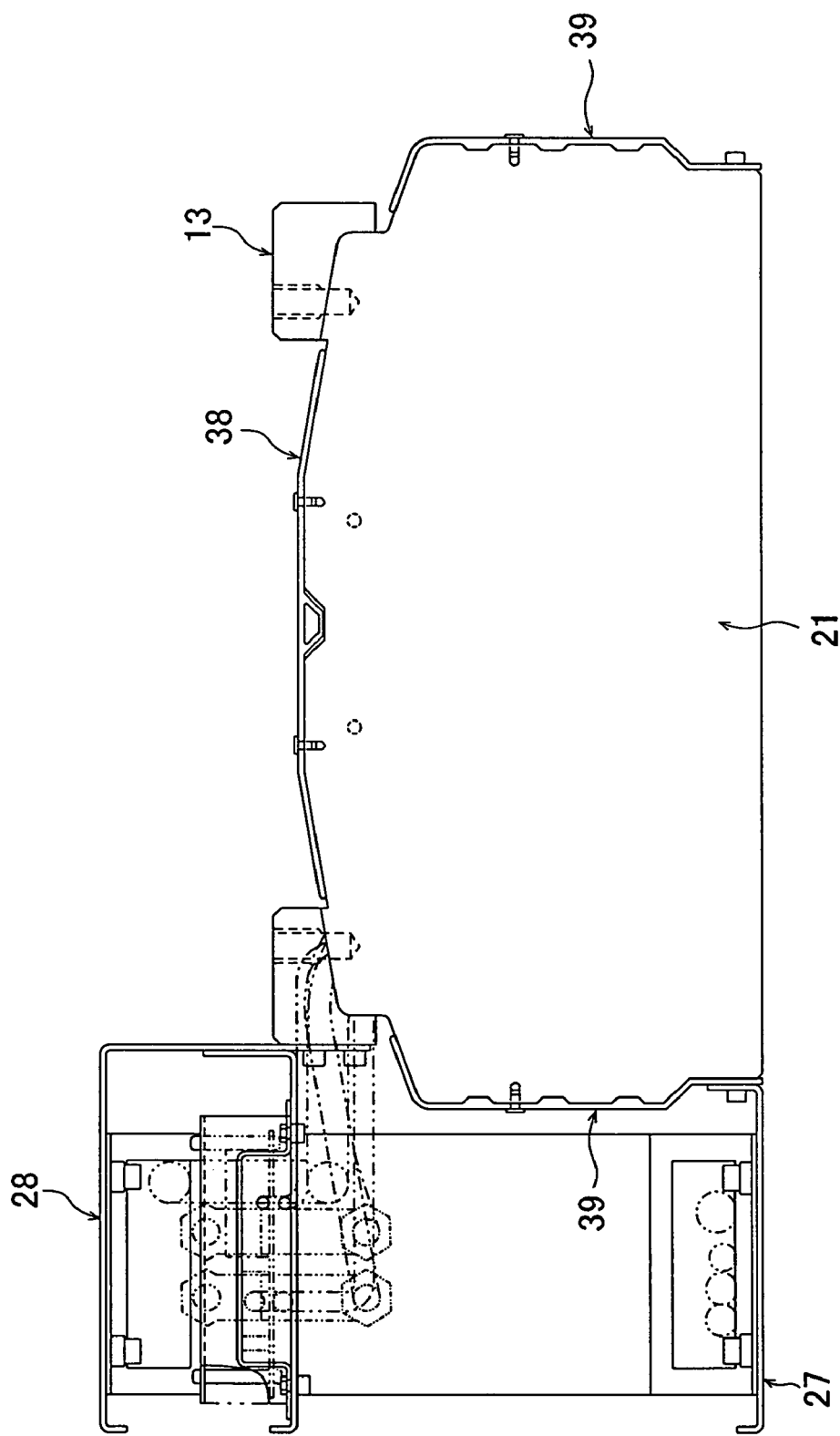
FIG. 6 is a view as seen in the direction of the arrow A-A in FIG. 5.
Figure 7:
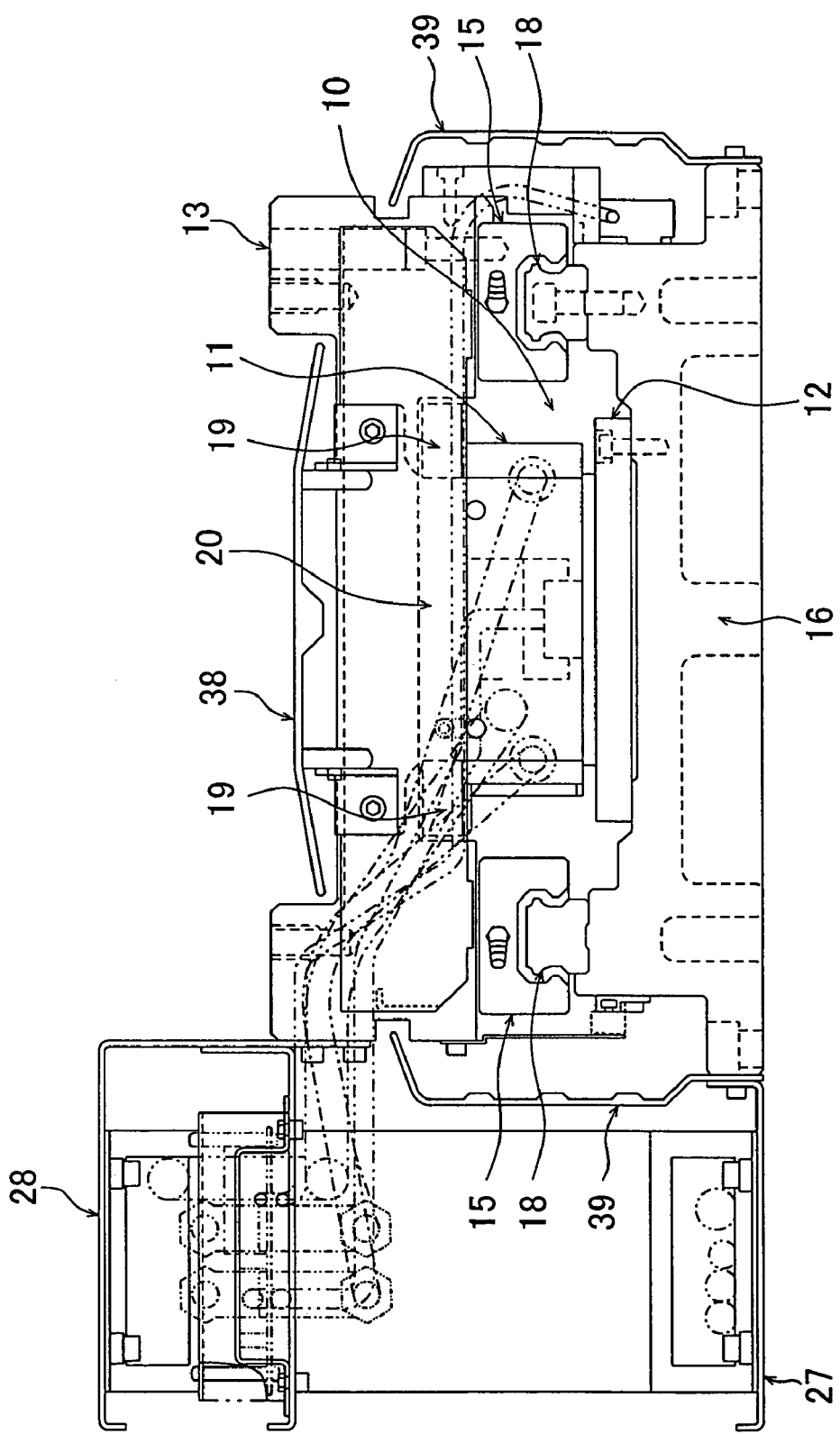
FIG. 7 is a view as seen in the direction of the arrow B-B in FIG. 5.

Next, a specific structural example of the drive guide apparatus according to the present invention will be described. FIGS. 4 to 7 show a structural example of the drive guide apparatus according to the present invention. FIG. 4 is a plan view. FIG. 5 is a side view. FIG. 6 is a view as seen in the direction of the arrow A-A in FIG. 5. FIG. 7 is a view as seen in the direction of the arrow B-B in FIG. 5. In FIGS. 4 to 7, the same reference numerals as those in FIGS. 2 and 3 denote the same or corresponding portions.

The primary side 11 of the linear motor 10 comprises armature coils and armature cores. The secondary side 12 of the linear motor 10 comprises a magnet plate. The secondary side 12 is secured to the base 16.

As shown in FIG. 7, thermal insulators 19 made of a glass-epoxy resin are provided between the primary side 11 of the linear motor 10 and the table 13 to prevent heat generated from the primary side 11 from being transferred to the table 13.

The thermal insulators 19 are disposed on both sides of the primary side 11 and elongated in the longitudinal direction of the rails 18. A recess 20 serving as a thermal insulating space is formed on the lower side of the table 13 at a position between the thermal insulators 19. The surface of the table 13 that faces the thermal insulating space (i.e. the inner surface of the recess 20) is formed into a mirror finished surface.

The rails 18 are disposed (secured) on the base 16 in parallel to each other at both sides of the secondary side 12 of the linear motor 10, which comprises a magnet plate. The rails 18 each have a plurality (two in the illustrated example) of moving blocks 15 provided thereon in such a manner as to be movable along the associated rail 18. The table 13 is supported by a plurality (four in the illustrated example) of moving blocks 15 movably provided on the rails 18.

When a driving electric current is passed through the armature coils (not shown) of the primary side 11 of the linear motor 10, the primary side 11 moves along the secondary side 12 in response to a magnetic interaction between the primary side 11 and the secondary side 12. The force of movement of the primary side 11 is transmitted to the moving blocks 15 through the table 13, causing the moving blocks 15 to move along the rails 18.

End plates 21 are installed on both end portions of the base 16. Stoppers 22 are mounted on the end plates 21, respectively. Scrapers 23 are attached to both ends of the table 13.

A linear scale 24 is provided on one side portion of the base 16. A linear encoder head 25 is attached to one side portion of the table 13 through a bracket 26 to read the linear scale 24 to thereby detect the travel position (travel distance) of the table 13.

A cable bear mount plate 27 is secured to the other side portion of the base 16. A cable bear socket 28 is secured to the other side portion of the table 13.

On the cable bear mount plate 27 are disposed a power cable 29 for supplying driving electric power to the primary side 11 of the linear motor 10, a signal cable 30 for transmission and reception of signals, and nylon tubes 31 for supplying water or the like to cool the primary side 11. The power cable 29, the signal cable 30 and the nylon tubes 31 are connected to the primary side 11 of the linear motor 10 through the cable bear socket 28.

It should be noted that reference numeral 38 in the figures denotes a center cover, and reference numeral 39 denotes side covers.

As has been stated above, the thermal insulators 19 are provided between the primary side 11 of the linear motor 10 and the table 13, and the recess 20 serving as a thermal insulating space is provided on the lower side of the table 13 at a position between the thermal insulators 19. Accordingly, heat generated from the primary side 11 of the linear motor 10 is prevented from being transferred to the table 13 by the heat transfer cutoff action of the thermal insulators 19 and the radiation heat blocking action of the recess 20. Therefore, there is no variation in the preload applied to the rolling elements arranged and accommodated in the endless recirculation passages of the moving blocks 15.

In addition, because the inner surface of the recess 20 formed on the lower side of the table 13 is formed into a mirror finished surface, the radiation heat blocking effect is further improved.

Figure 8:
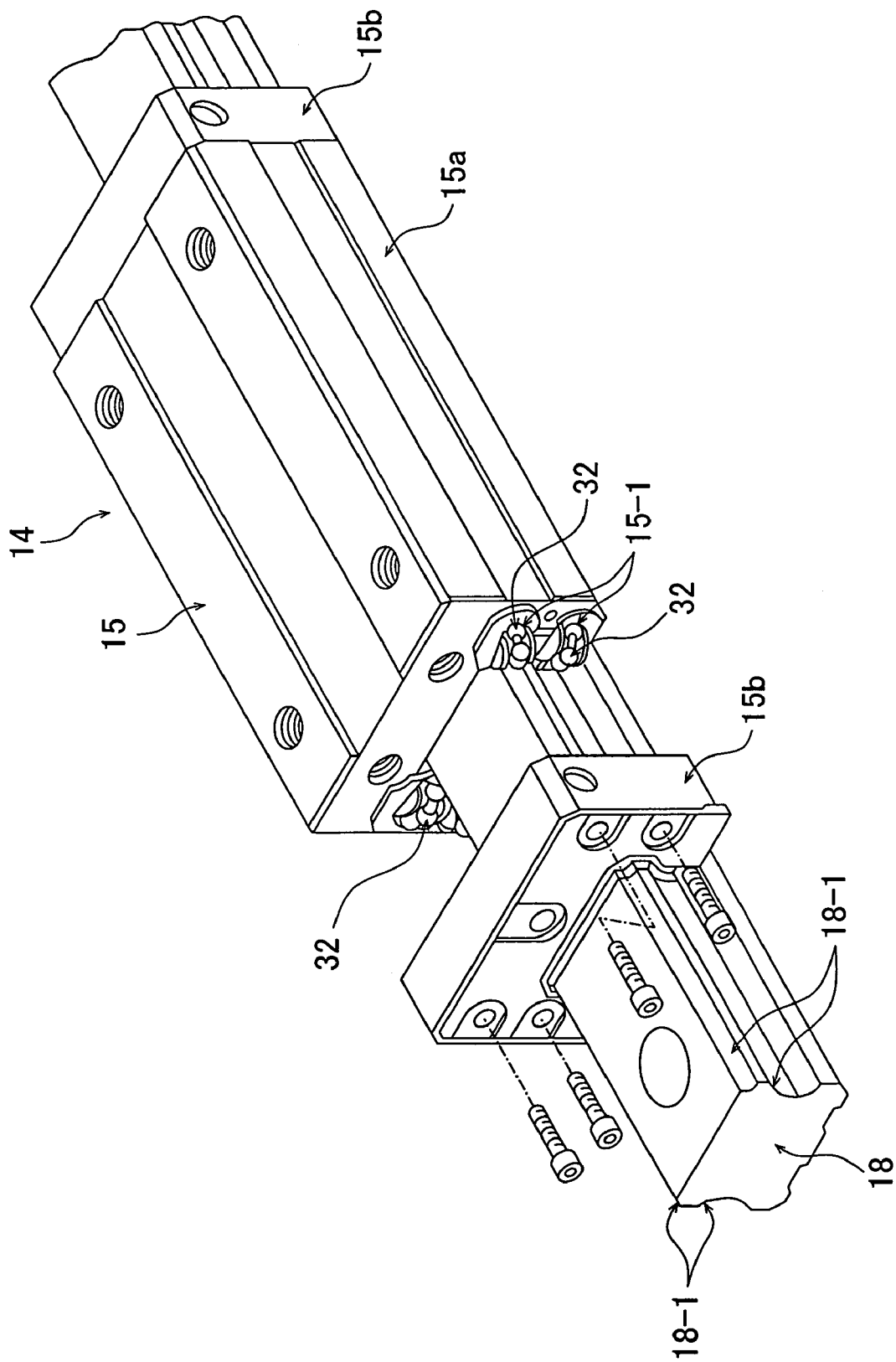
FIG. 8 is a perspective view showing a structural example of a guide mechanism of the drive guide apparatus according to the present invention.
Figure 9:
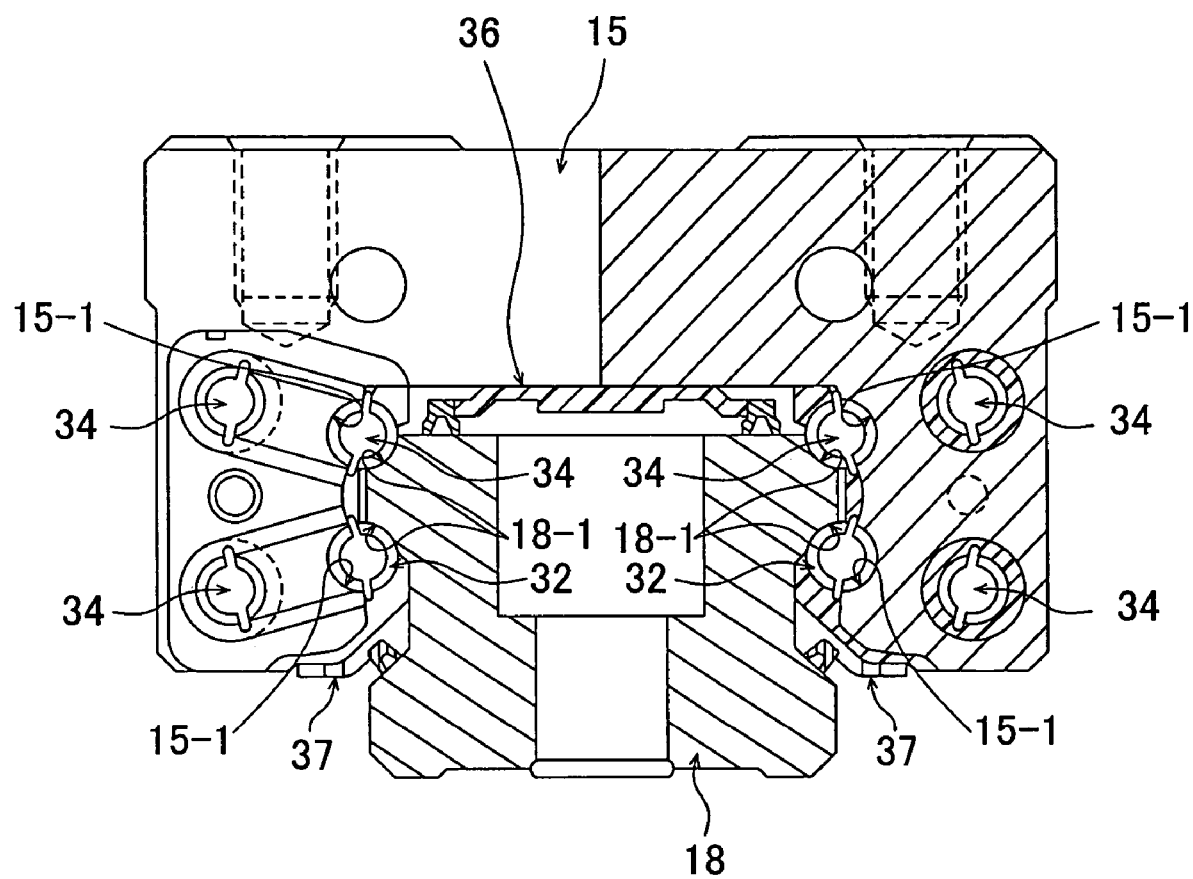
FIG. 9 is a sectional view showing a structural example of the guide mechanism of the drive guide apparatus according to the present invention.
Figure 10:
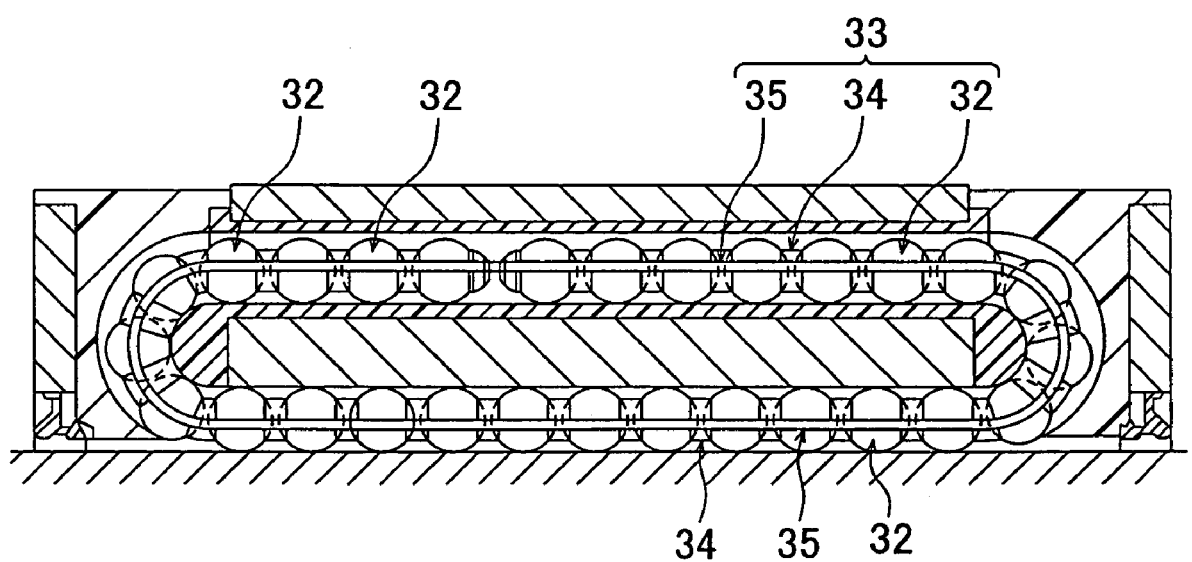
FIG. 10 is a sectional view showing a structural example of a moving block in the guide mechanism of the drive guide apparatus according to the present invention.

FIGS. 8 to 10 are diagrams showing the arrangement of the guide mechanism 14 in detail. FIG. 8 is a perspective view. FIG. 9 is a sectional view. FIG. 10 is a sectional view of a moving block.

Each rail 18 with a rectangular sectional configuration has two ball rolling grooves 18-1 formed on each of the right and left sides thereof as rolling element rolling surfaces extending along the longitudinal direction of the rail 18. That is, a total of four ball rolling grooves 18-1 are formed on each rail 18. Each moving block 15 has endless recirculation passages including load rolling grooves 15-1 forming load rolling element rolling passages that face opposite the ball rolling grooves 18-1. A plurality of balls 32 as rolling elements are arranged and accommodated in the endless recirculation passages. The balls 32 roll between the ball rolling grooves 18-1 and the corresponding load rolling grooves 15-1 in response to the relative movement of the rail 18 and the moving block 15. In this way, the balls 32 recirculate through the endless recirculation passages.

The guide mechanism 14 is arranged so as to be able to carry loads applied in all directions, i.e. moments in all directions, not to mention radial loads and horizontal loads.

Each moving block 15 comprises a moving block body 15a and end caps 15b. The moving block body 15a is formed with the load rolling grooves 15-1 and ball return passages parallel to the respective load rolling grooves 15-1. The end caps 15b are connected to both ends, respectively, of the moving block body 15a. Each end cap 15b has direction change passages that connect the load rolling grooves 15-1 and the ball return passages, respectively. The moving block 15 is mounted in such a manner as to sit astride the rail 18. The top of the moving block 15 is arranged so that the table 13 is mounted and secured thereto.

The load rolling grooves 15-1 of the moving block 15 are formed facing opposite the respective ball rolling grooves 18-1 on the rail 18. A plurality of balls 32, i.e. rolling elements, are put between the load rolling grooves 15-1 and the ball rolling grooves 18-1.

As the moving block 15 moves, the balls 32 are fed into the ball return passages through the direction change passages formed in the end caps 15b and led to the load rolling grooves 15-1 again. In this way, the balls 32 recirculate through the endless recirculation passages.

As shown in FIGS. 9 and 10, the plurality of balls 32 are rotatably and slidably retained in series by a retaining member 33. The retaining member 33 comprises spacers 34 disposed alternately with the balls 32 and a sheet-shaped flexible belt 35 connecting the spacers 34.

The balls 32 arranged and accommodated in the endless recirculation passages are given a predetermined preload (contact pressure) to ensure smooth rolling of the balls 32.

A seal member 36 is provided between the top of the rail 18 and the moving block 15. Seal members 37 are provided between the moving block 15 and two sides of the rail 18. The seal members 36 and 37 prevent leakage to the outside of a lubricant filled between the ball rolling grooves 18-1 and the load rolling grooves 15-1 and also prevent entry of dust from the outside.

Figure 11:
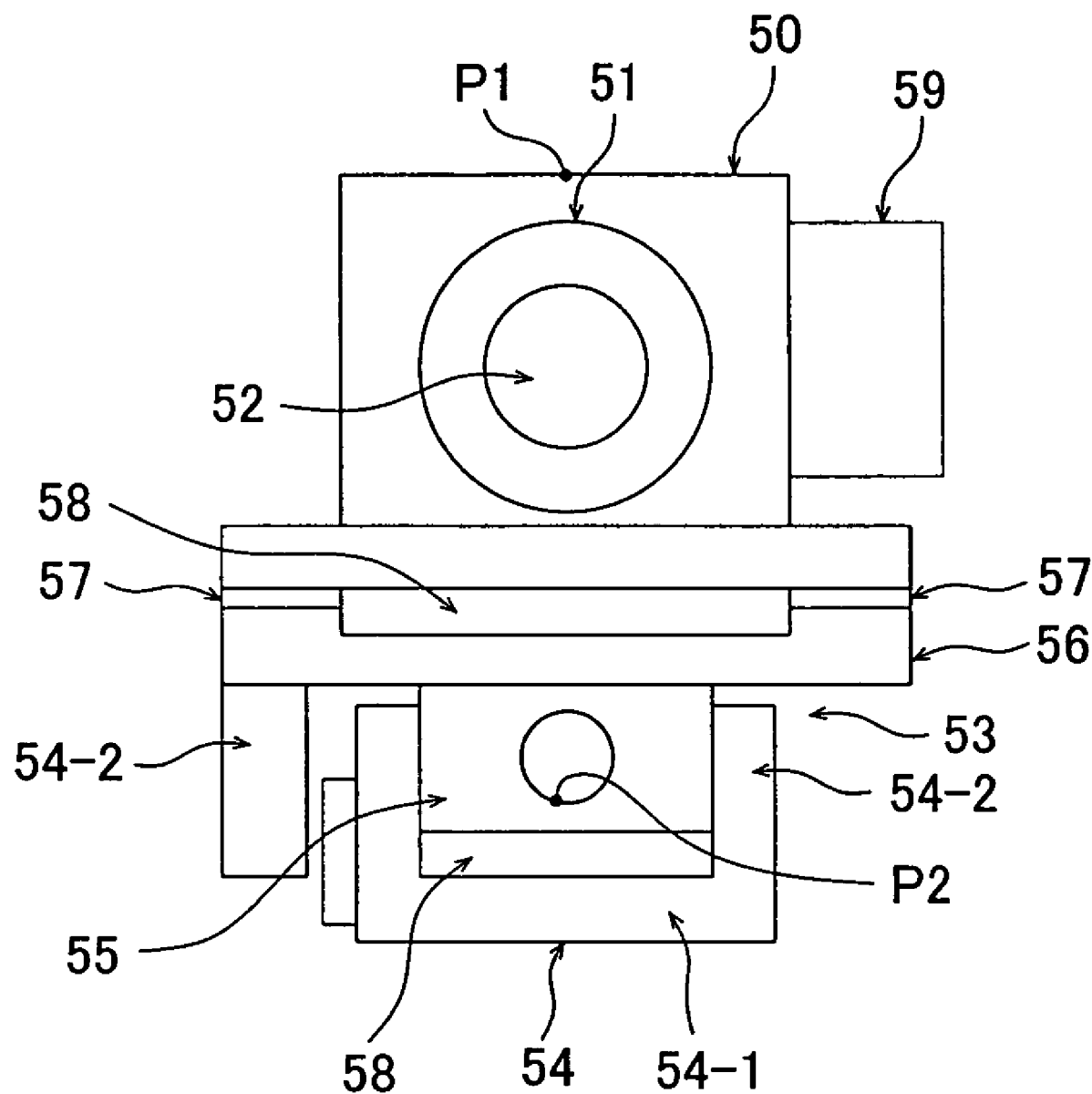
FIG. 11 is a diagram showing schematically a structural example of another embodiment of the drive guide apparatus according to the present invention.

FIG. 11 is a diagram showing schematically a structural example of another embodiment of the drive guide apparatus according to the present invention. In the figure, a cylindrical linear motor 50 comprises a cylindrical primary side 51, which is an energized side including armature coils, and a secondary side 52 formed from a long columnar thrust shaft, which is a non-energized side.

A guide mechanism 53 has an outer rail 54 comprising a base portion 54-1 and a pair of side walls 54-2 standing on both sides of the base portion 54-1. The guide mechanism 53 further has an inner block 55 movable in a groove defined in a recess 58 that is formed between the side walls 54-2 of the outer rail 54.

A table 56 is mounted on the inner block 55 of the guide mechanism 53. The table 56 has a longitudinal recess 58 formed in the center of the top thereof. The linear motor 50 is attached to the table 56 through thermal insulators 57.

In the drive guide apparatus arranged as stated above, if the thermal insulators 57 are not interposed between the table 56 and the linear motor 50, heat generated from the armature coils (not shown) of the primary side 51 of the linear motor 50 when a driving electric current is passed through the armature coils will be transferred to the inner block 55 through the table 56, causing the inner block 55 to expand thermally.

The outer rail 54 has a plurality of rolling element rolling surfaces extending in the longitudinal direction thereof, as will be detailed later. The inner block 55 is formed with endless recirculation passages including load rolling element rolling passages corresponding to the rolling element rolling surfaces.

A plurality of rolling elements (balls) are arranged and accommodated in the endless recirculation passages so as to roll and recirculate therethrough. Because the rolling elements have been given a predetermined preload, if the inner block 55 thermally expands, the preload increases or decreases.

In this example, the thermal insulators 57 are interposed between the table 56 and the linear motor 50. Therefore, heat generated from the primary side 51 of the linear motor 50 is blocked by the thermal insulators 57 from being transferred to the table 56 or the inner block 55. Accordingly, the inner block 55 will not thermally expand. Thus, there is no variation in the preload applied to the plurality of rolling elements (balls) arranged and accommodated in the endless recirculation passages as stated above.

The recess 58 formed in the center of the top of the table 56 acts as a thermal insulating space that cuts off the transfer of radiation heat from the primary side 51. If the inner surface of the recess 58 is formed into a mirror finished surface, the effect of cutting off the transfer of radiation heat is further improved.

It should be noted that reference numeral 59 denotes a cable socket for connection with a power cable for supplying driving electric power to the primary side 51 of the linear motor 50 and a signal cable for signal transmission and reception.

Figure 12:
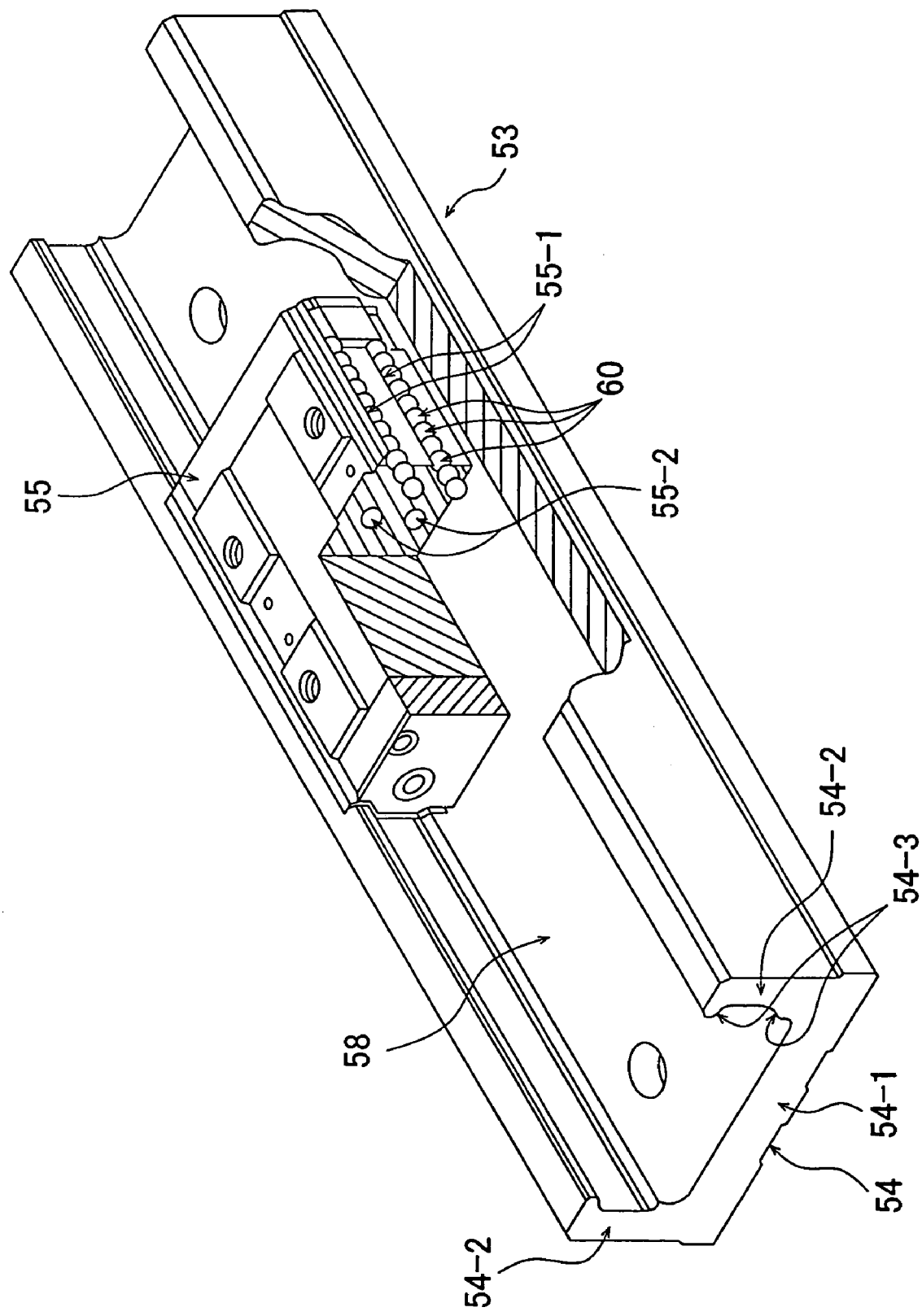
FIG. 12 is a perspective view showing a structural example of a guide mechanism of the drive guide apparatus according to the present invention.

FIG. 12 is a diagram showing a structural example of the guide mechanism 53. As shown in the figure, the inner block 55 is movable in the groove in the recess 58 formed between the side walls 54-2 standing on both sides of the base portion 54-1 of the outer rail 54.

The inner side surface of each side wall 54-2 has two ball rolling grooves 54-3 formed as rolling element rolling surfaces along the longitudinal direction of the outer rail 54.

Each outer side surface of the inner block 55 is formed with load rolling grooves 55-1 as load rolling element rolling passages corresponding to the ball rolling grooves 54-3 formed on the outer rail 54. Balls 60 as rolling elements roll between the ball rolling grooves 54-3 of the outer rail 54 and the load rolling grooves 55-1 of the inner block 55 while carrying a load.

The inner block 55 has endless recirculation passages 55-2 for the balls 60 in correspondence to the respective load rolling grooves 55-1. By endlessly recirculating the balls 60 rolling along the load rolling grooves 55-1, the inner block 55 moves along the outer rail 54.

A table 56 is secured to the top of the inner block 55, as stated above. The plurality of balls 60 arranged and accommodated in the endless recirculation passages 55-2 of the inner block 55 have been given a predetermined preload to ensure smooth rolling of the balls 60.

Figure 13:
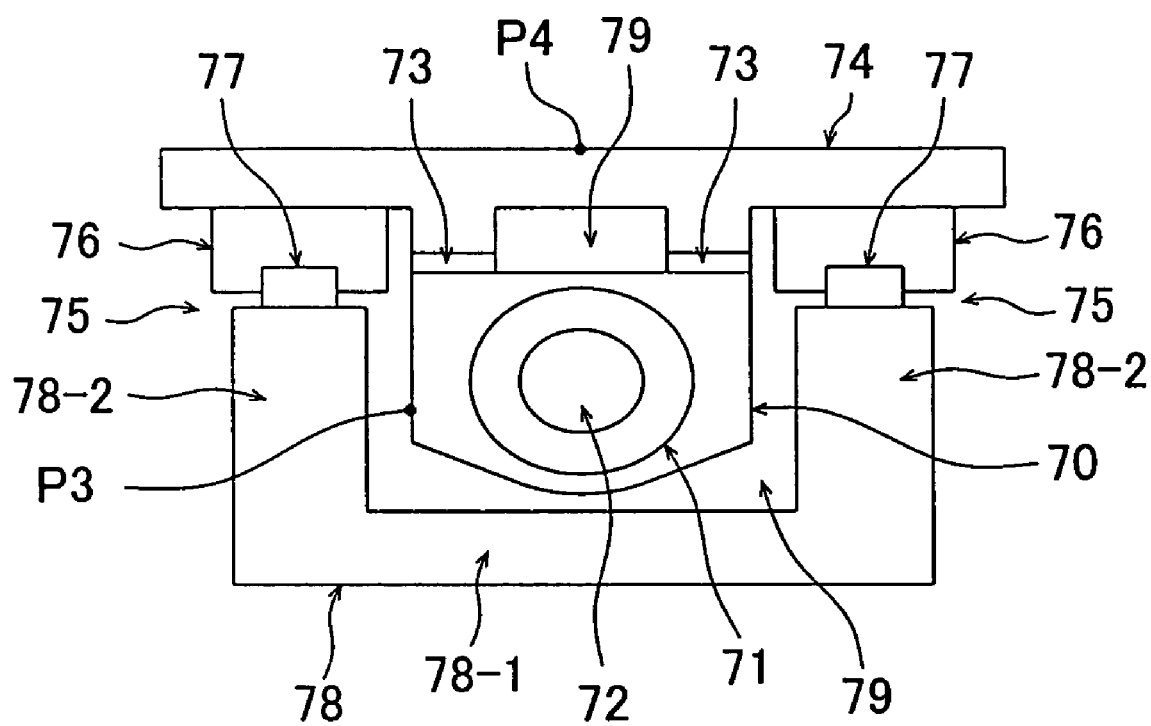
FIG. 13 is a diagram showing schematically a structural example of still another embodiment of the drive guide apparatus according to the present invention.

FIG. 13 is a diagram showing schematically a structural example of still another embodiment of the drive guide apparatus according to the present invention. In the figure, a cylindrical linear motor 70 comprises a cylindrical primary side 71, which is an energized side including armature coils, and a secondary side 72 formed from a long columnar thrust shaft, which is a non-energized side.

Guide mechanisms 75 respectively comprise rails 77 provided on the respective upper end surfaces of side walls 78-2 standing on both sides of a base portion 78-1. Moving blocks 76 are mounted in such a manner as to sit astride the rails 77, respectively.

The primary side 71 of the linear motor 70 is secured to a table 74 through thermal insulators 73. The table 74 is secured to the moving blocks 76 of the guide mechanisms 75. A recess 79 acting as a thermal insulating space is formed on the lower side of the table 74 at a position between the thermal insulators 73.

When the armature coils (not shown) of the primary side 71 of the linear motor 70 are supplied with an electric current, the primary side 71 moves in the groove in the recess 79 formed between the side walls 78-2 along the rails 77. Energization of the armature coils causes generation of heat from the primary side 71. However, the heat is blocked by the thermal insulators 73 from being transferred to the table 74. The recess 79 formed on the lower side of the table 74 acts as a space for cutting off the transfer of radiation heat from the primary side 71 and thus blocks the radiation heat.

It should be noted that if the inner surface of the recess 79 is formed into a mirror finished surface, the effect of cutting off the transfer of radiation heat is further improved.

The arrangement of the guide mechanisms 75 is approximately the same as that of the guide mechanism shown in FIGS. 8 to 10 (however, these guide mechanisms differ from each other in the number of rows of endlessly recirculating ball trains and in the layout thereof). Therefore, a description thereof is omitted.

As has been stated above, the thermal insulators 73 are interposed between the primary side 71 of the linear motor 70 and the table 74, and the recess 79 serving as a radiation heat blocking space is formed on the lower side of the table 74. With this arrangement, heat generated from the primary side 71 is prevented from being transferred to the table 74. Consequently, thermal expansion of the table 74 will not occur. Therefore, there is no variation in the preload applied to the rolling elements arranged and accommodated in the endless recirculation passages of the guide mechanisms 75.

In the above-described example, the thermal insulator is provided between the primary side of the linear motor and the moving block, that is, the moving member, indirectly with the table, etc. interposed therebetween. It should be noted, however, that the thermal insulator may be interposed directly between the primary side of the linear motor and the moving block. In addition, although in the above-described example the thermal insulating means is interposed between the primary side of the linear motor and the moving member, the thermal insulating means may be provided between the primary side of the linear motor and the track (rail) to prevent heat generated from the primary side from being transferred to the rail.

Incidentally, the guide mechanism for guiding the primary side and the secondary side of the linear motor in the foregoing examples employs a rolling guide arrangement in which the rail (rails 18 and outer rail 54) and the moving block (moving blocks 15 and inner block 55) are movable relative to each other through the rolling elements (balls or rollers) interposed therebetween. However, the present invention is not limited to the rolling guide arrangement but may employ a slide guide arrangement.

Figure 14:
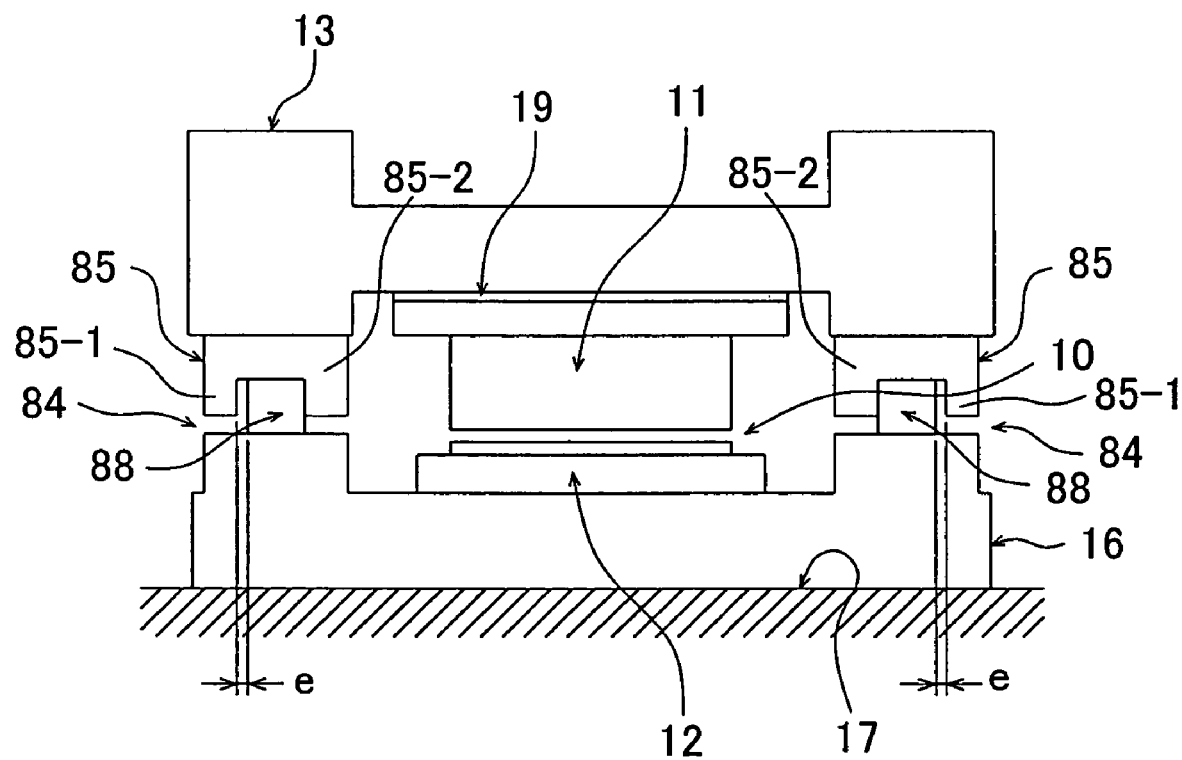
FIG. 14 is a diagram showing schematically a structural example of a drive guide apparatus having a slide guide mechanism according to the present invention.

FIG. 14 is a diagram showing schematically a structural example of a drive guide apparatus having a slide guide mechanism 84. This drive guide apparatus is arranged in the same way as the drive guide apparatus according to the first embodiment shown in FIG. 2 except the following arrangement.

As shown in the figure, a pair of guide mechanisms 84 are respectively provided on the right and left sides of the base 16. Each guide mechanism 84 has a rail 88 with a rectangular sectional configuration and a moving block 85 mounted astride the rail 88 in such a manner as to be movable relative to the rail 88. The table 13 is fitted to the upper sides of the moving blocks 85. The rails 88 and the moving blocks 85 are slidably assembled together directly with no rolling elements interposed therebetween to form a slide guide.

More specifically, assuming that the mutually opposing surfaces of the rails 88 of the two guide mechanisms 84 are inner surfaces, a gap e is formed between the outer surface of each rail 88 and the outer leg portion 85-1 of the associated moving block 85. That is, the two rails 88 are in sliding contact with the associated moving blocks 85 at their inner and upper surfaces. Further, a predetermined surface pressure is produced between the inner surface of each rail 88 and the inner leg portion 85-2 of the associated moving block 85.

In this drive guide apparatus also, the thermal insulator 19 is provided between the primary side 11 of the linear motor 10 and the table 13. Thus, heat generated from the armature coils (not shown) of the primary side 11 when a driving electric current is passed through the armature coils is prevented from being transferred to the table 13 or the moving blocks 85. Accordingly, neither the table 13 nor the moving blocks 85 will thermally expand. Therefore, sliding resistance between the rails 88 and the moving blocks 85 is prevented from varying and kept constant. Thus, it is possible to ensure an increased lifetime for the drive guide apparatus.

Figure 15:
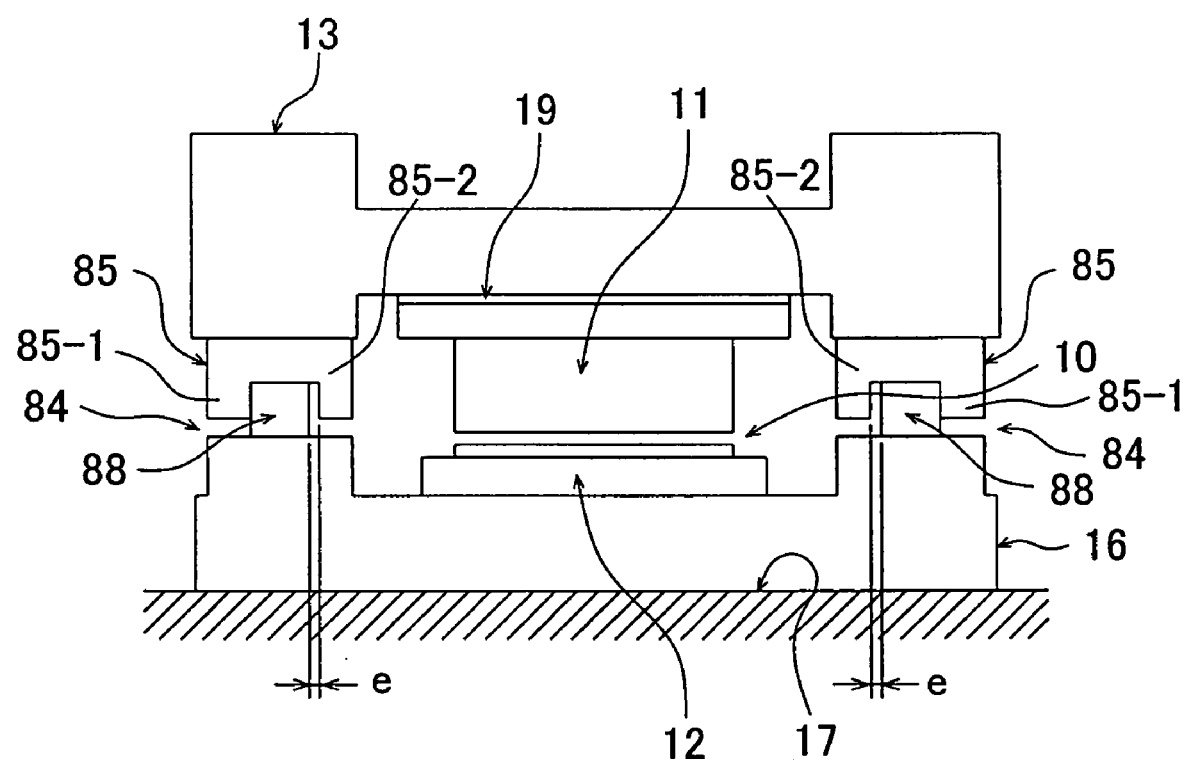
FIG. 15 is a diagram showing schematically a structural example of another drive guide apparatus having a slide guide mechanism according to the present invention.

FIG. 15 is a diagram showing schematically the arrangement of another drive guide apparatus having a slide guide mechanism. This drive guide apparatus is arranged in the same way as the drive guide apparatus shown in FIG. 14 except the following arrangement.

As illustrated in the figure, assuming that the mutually opposing surfaces of the rails 88 of two guide mechanisms 84 provided on the right and left sides are inner surfaces, a gap e is formed between the inner surface of each rail 88 and the inner leg portion 85-2 of the associated moving block 85. That is, the two rails 88 are in sliding contact with the associated moving blocks 85 at their outer and upper surfaces. Further, a predetermined surface pressure is applied between the outer surface of each rail 88 and the outer leg portion 85-1 of the associated moving block 85.

In this drive guide apparatus also, the transfer of heat generated from the armature coils of the primary side 11 of the linear motor 10 is cut off by the thermal insulator 19 in the same way as in the drive guide apparatus shown in FIG. 14. Accordingly, neither the table 13 nor the moving blocks 85 will thermally expand. Therefore, sliding resistance between the rails 88 and the moving blocks 85 is prevented from varying. Thus, it is possible to ensure an increased lifetime for the drive guide apparatus.

Figure 16:
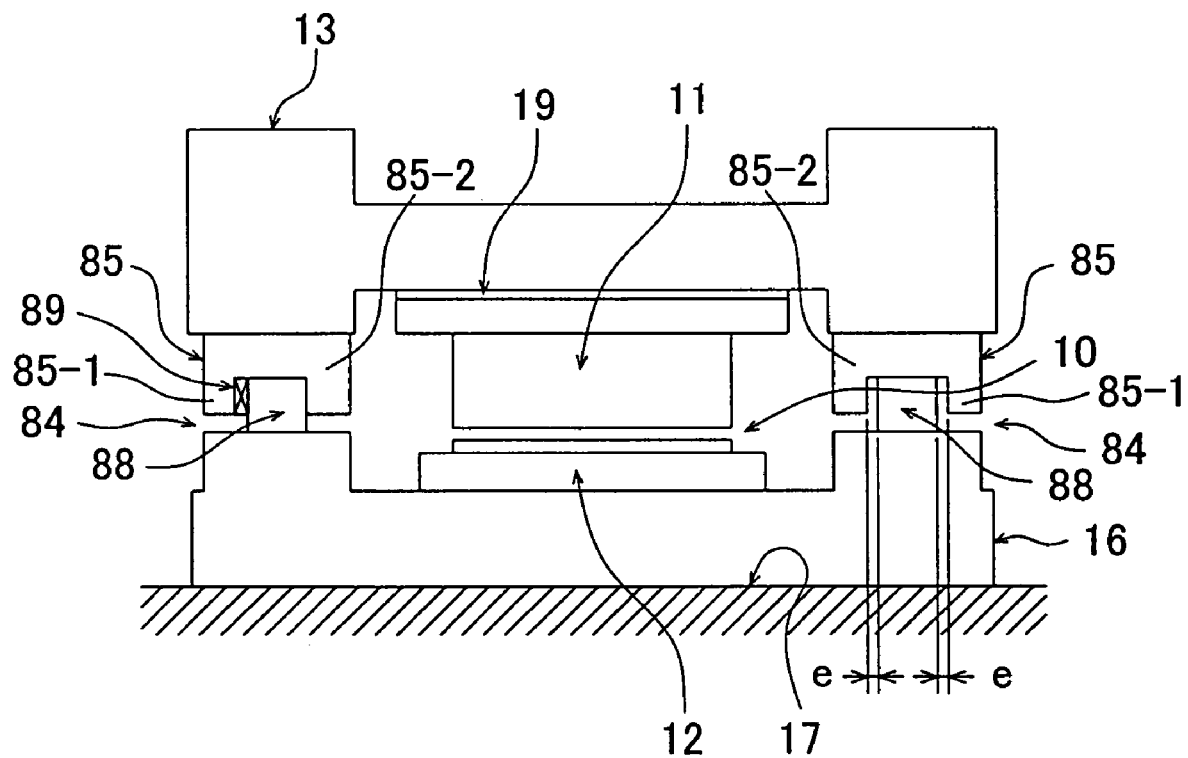
FIG. 16 is a diagram showing schematically a structural example of still another drive guide apparatus having a slide guide mechanism according to the present invention.

FIG. 16 shows schematically the arrangement of still another drive guide apparatus having a slide guide mechanism. This drive guide apparatus is arranged in the same way as the drive guide apparatus shown in FIGS. 14 and 15 except the following arrangement.

In this drive guide apparatus, as shown in the figure, the rail 88 of one of the two guide mechanisms 84 provided on the right and left sides, i.e. the right guide mechanism 84 in the illustrated example, has gaps e formed respectively between the inner and outer surfaces thereof and the inner and outer leg portions 85-1 and 85-2 of the associated moving block 85. In other words, the rail 88 is in sliding contact with the moving block 85 only at the upper surface thereof.

The rail 88 of the other, or left guide mechanism 84 is in sliding contact with the associated moving block 85 at the inner and upper surface thereof. The outer surface of the rail 88 is in engagement with the inner leg portion 85-2 of the moving block 85 through a gib 89. In other words, a predetermined surface pressure is applied between the outer surface of the rail 88 and the outer leg portion 85-1 of the associated moving block 85. In addition, a predetermined surface pressure is applied between the inner surface of the rail 88 and the inner leg portion 85-2 of the moving block 85.

In this drive guide apparatus also, the transfer of heat generated from the armature coils of the primary side 11 of the linear motor 10 is cut off by the thermal insulator 19 in the same way as in the drive guide apparatus shown in FIGS. 14 and 15. Accordingly, neither the table 13 nor the moving blocks 85 will thermally expand. Therefore, sliding resistance between the rails 88 and the moving blocks 85 is prevented from varying. Thus, it is possible to ensure an increased lifetime for the drive guide apparatus.

Figure 17:
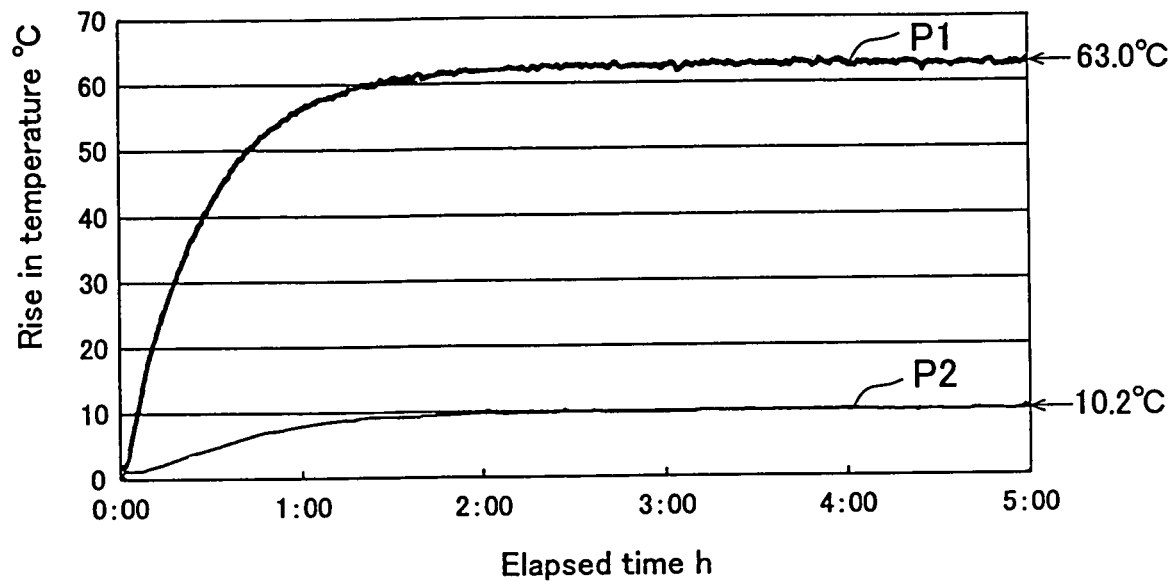
FIG. 17 is a graph showing exemplarily the result of a temperature-rise test performed on the drive guide apparatus according to the present invention.
Figure 18:
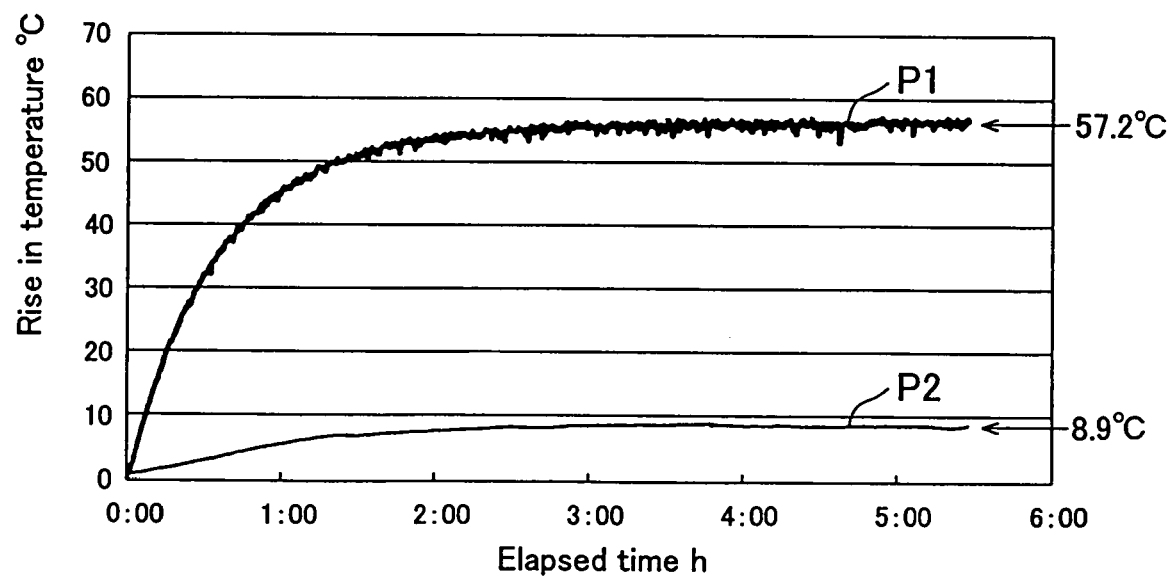
FIG. 18 is a graph showing exemplarily the result of a temperature-rise test performed on the drive guide apparatus according to the present invention.

FIGS. 17 and 18 are graphs showing the results of temperature-rise tests performed on the drive guide apparatus arranged as shown in FIG. 11. In the graphs, the abscissa axis represents the elapsed time (h (hour)), and the ordinate axis represents the rise in temperature (° C.). Temperature measurement points are a point P1 on the linear motor 50 and a point P2 on the inner block 55. In a state where the travel of the primary side 51 as the energized side of the linear motor 50 was suspended (retrained), the primary side 51 was supplied with an electric current to measure a rise in temperature thereof.

FIGS. 17 and 18 show examples of temperature-rise tests performed on linear motors 50 different in ratings from each other. FIGS. 17 and 18 show the results of temperature-rise tests in which a rated peak current of 2.86 A and a rated peak current of 2.96 A were supplied to the primary sides 51 of the linear motors 50, respectively.

In the example of FIG. 17, the temperature at the point P1 on the linear motor 50 rises to 63.0° C., whereas the temperature at the point P2 on the inner block 55 rises only to 10.2° C. Thus, the graph shows a remarkable thermal insulating effect produced by providing the thermal insulators 57 between the table 56 and the linear motor 50 and further forming a space defined by the recess 58 in the center of the top of the table 56.

In the example of FIG. 18, the temperature at the point P1 on the linear motor 50 rises to 57.2° C., whereas the temperature at the point P2 on the inner block 55 rises only to 8.9° C. Thus, the graph shows a remarkable thermal insulating effect produced by providing the thermal insulators 57 between the table 56 and the linear motor 50 and further forming a space defined by the recess 58 in the center of the top of the table 56.

Figure 19:
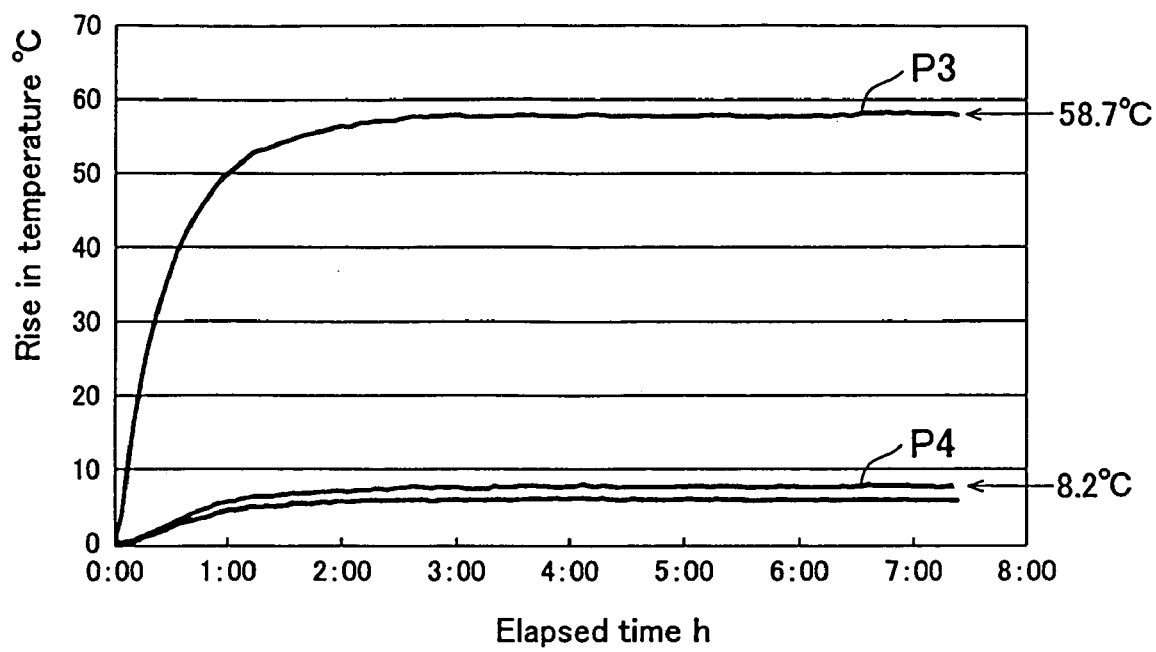
FIG. 19 is a graph showing exemplarily the result of a temperature-rise test performed on the drive guide apparatus according to the present invention.
Figure 20:
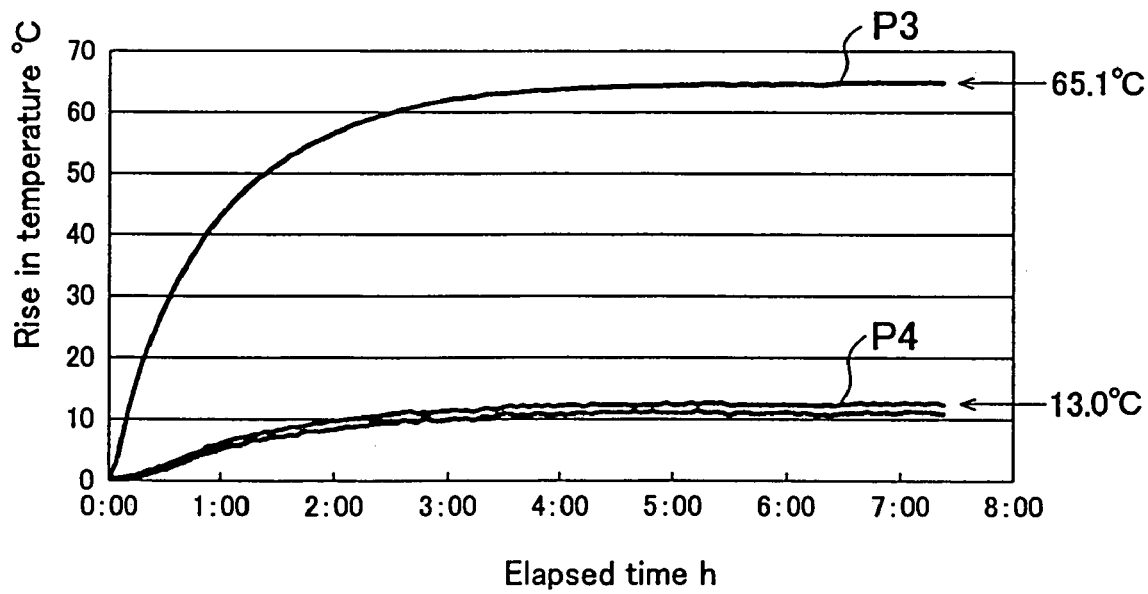
FIG. 20 is a graph showing exemplarily the result of a temperature-rise test performed on the drive guide apparatus according to the present invention.

FIGS. 19 and 20 are graphs showing the results of temperature-rise tests performed on the drive guide apparatus arranged as shown in FIG. 13. In the graphs, the abscissa axis represents the elapsed time (h), and the ordinate axis represents the rise in temperature (° C.). Temperature measurement points are a point P3 on the linear motor 70 and a point P4 on the top of the table 74. In a state where the travel of the primary side 71 as the energized side of the linear motor 70 was suspended (retrained), the primary side (armature coils) 51 was supplied with an electric current to measure a rise in temperature thereof.

FIGS. 19 and 20 show examples of temperature-rise tests performed on linear motors 70 different in ratings from each other. FIGS. 19 and 20 show the results of temperature-rise tests in which a rated peak current of 2.34 A and a rated peak current of 2.23 A were supplied to the primary sides 71 of the linear motors 70, respectively.

In the example of FIG. 19, the temperature at the point P3 on the linear motor 70 rises to 58.7° C., whereas the temperature at the point P4 on the table 74 rises only to 8.2° C. Thus, the graph shows a remarkable thermal insulating effect produced by providing the thermal insulators 73 between the table 74 and the linear motor 70 and further forming a space defined by the recess 79 in the center of the lower side of the table 74.

In the example of FIG. 20, the temperature at the point P3 on the linear motor 70 rises to 65.1° C., whereas the temperature at the point P4 on the table 74 rises only to 13.0° C. Thus, the graph shows a remarkable thermal insulating effect produced by providing the thermal insulators 73 between the table 74 and the linear motor 70 and further forming a space defined by the recess 79 in the center of the lower side of the table 74.

Figure 21:
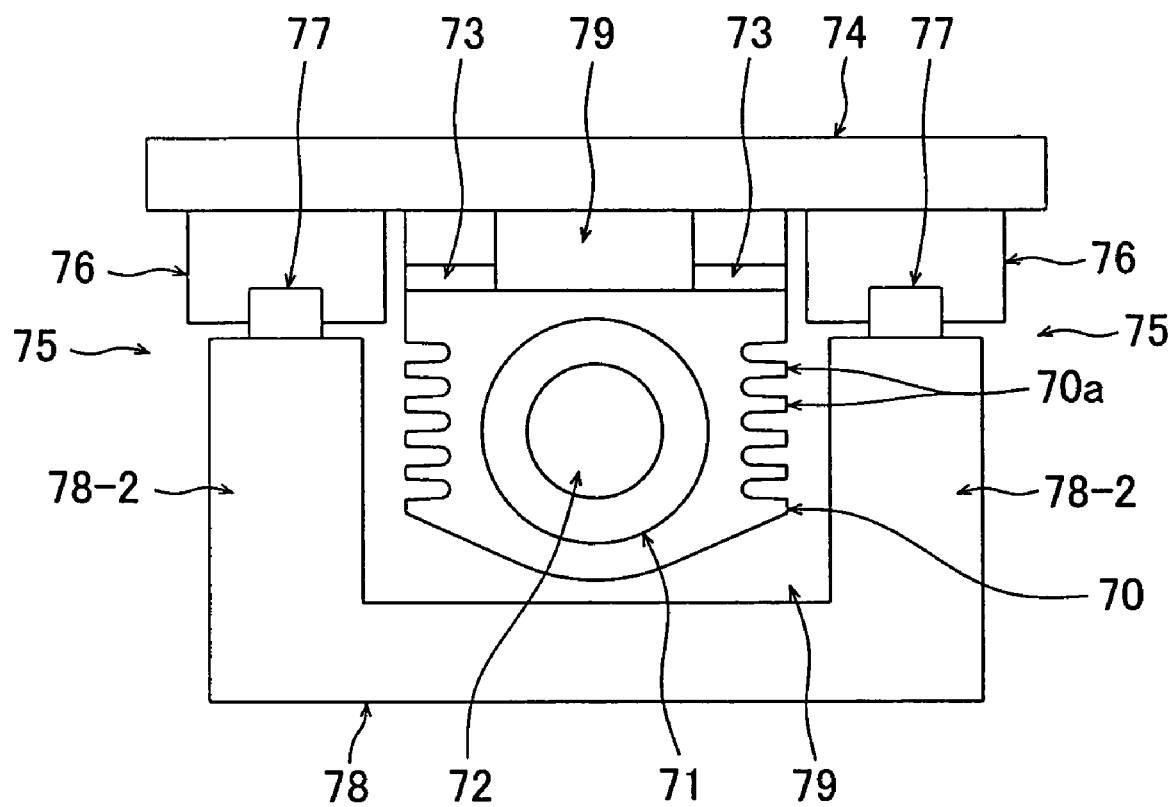
FIG. 21 is a diagram showing schematically a structural example of the drive guide apparatus according to the present invention.

As has been stated above, a thermal insulating effect is produced by providing a thermal insulator and a space for blocking heat generated from the primary side of the linear motor between the primary side and the rail or the moving member of the guide mechanism to which the primary side of the linear motor is connected. However, to further improve the thermal insulating effect (heat dissipation effect), a multiplicity of fins 70a may be provided on the outer surfaces of the linear motor 70, as shown in FIG. 21. It should be noted that the drive guide apparatus shown in FIG. 21 is the same as the drive guide apparatus shown in FIG. 13 except that a multiplicity of fins 70a are provided on the outer surfaces of the linear motor 70. The operation of the drive guide apparatus shown in FIG. 21 is the same as that of the drive guide apparatus shown in FIG. 13.

Figure 22:
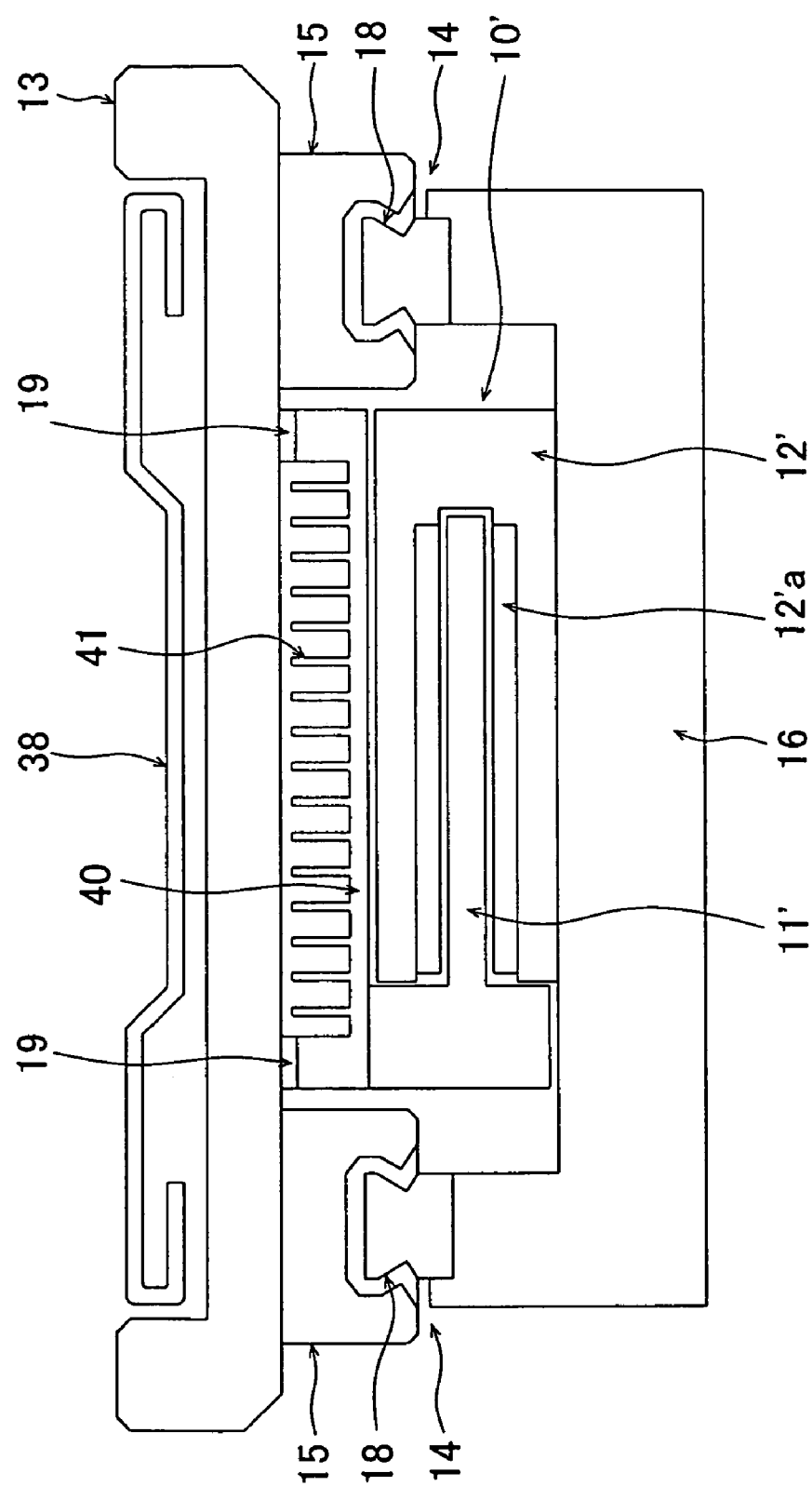
FIG. 22 is a diagram showing a structural example of the drive guide apparatus according to the present invention.

FIG. 22 is a diagram showing a specific structural example of the drive guide apparatus according to the present invention. The drive guide apparatus is approximately the same as the drive guide apparatus shown in FIGS. 4 to 7 in terms of the arrangement of the main body part thereof but differs from the latter in the structure of the linear motor and in the arrangement for dissipating heat from the heat generating part of the linear motor. That is, a linear motor 10' of the drive guide apparatus has a secondary side (stationary side) 12' formed with a U-shaped sectional configuration. The primary side (moving side) 11' of the linear motor 10' has a plate-shaped configuration. The primary side 11' is movable through a groove with a U-shaped sectional configuration defined in the secondary side 12'.

The primary side 11' has a finned heatsink 40 secured thereto integrally. The heatsink 40 has a multiplicity of radiating fins 41. A table 13 is provided over the finned heatsink 40 with thermal insulators 19 interposed therebetween.

In the drive guide apparatus arranged as stated above, when a driving electric current is passed through the armature coils (not shown) of the primary side 11', the table 13, which is secured to the primary side 11' with the finned heatsink 40 and the thermal insulators 19 interposed therebetween, moves in response to driving force from the primary side 11' while being guided by the guide mechanisms 14. That is, the table 13 secured to the moving blocks 15 moves along the rails 18.

Thus, the linear motor 10' is arranged such that the plate-shaped primary side 11' moves through the groove in the secondary side 12' formed with a U-shaped sectional configuration. With this arrangement, the primary side (armature coils) 11' is surrounded by the secondary side (consisting essentially of magnets) 12'. Therefore, dissipation of heat generated from the primary side 11' is prevented.

In this example, the finned heatsink 40 is integrally secured to the primary side 11', as stated above. Therefore, heat generated from the primary side 11' is transferred to the finned heatsink 40 and efficiently dissipated from the radiating fins 41.

The finned heatsink 40 employs an already-known arrangement in which a heat pipe is provided in the heatsink 40, for example. By attaching the finned heatsink 40 to the primary side 11' of the linear motor 10' as stated above, heat generated from the primary side 11' is dissipated efficiently even in the case of the linear motor 10' having an arrangement in which the primary side 11' is surrounded by the secondary side (magnets) 12' and hence the heat dissipation effect is not good. Thus, it becomes possible to minimize the rise in temperature of the linear motor 10'.

Further, because the thermal insulators 19 are interposed between the finned heatsink 40 and the table 13, the transfer of heat to the table 13 or the moving blocks 15 is further retarded.

Figure 23:
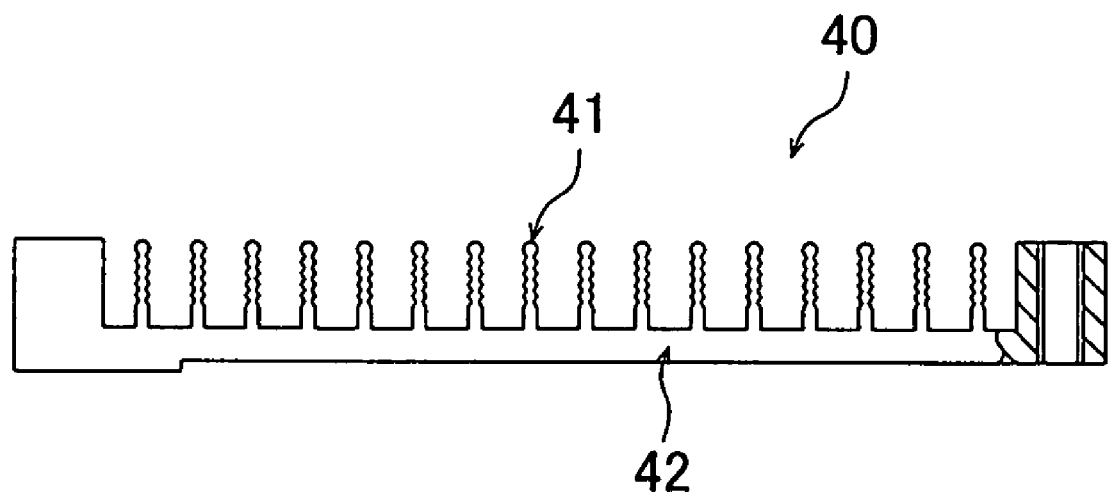
FIG. 23 is a diagram showing the arrangement of a radiating fin plate of a finned heatsink of the drive guide apparatus shown in FIG. 22.
Figure 24:
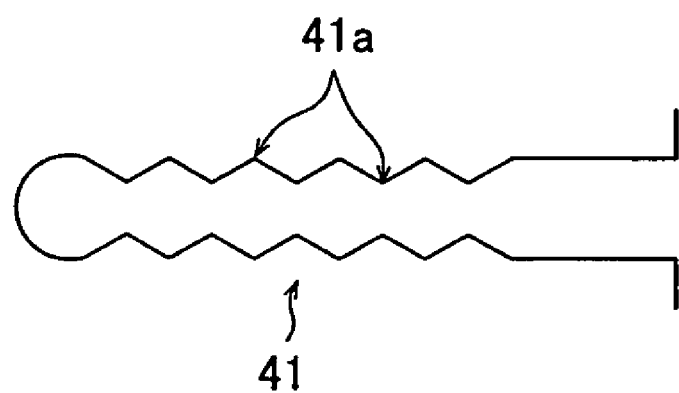
FIG. 24 is a diagram showing the arrangement of a radiating fin of the radiating fin plate shown in FIG. 23.

FIG. 23 is a diagram showing a structural example of a radiating fin plate of the above-described finned heatsink. FIG. 24 is an enlarged view of a radiating fin.

The radiating fin plate has a structure in which a multiplicity of long plate-shaped radiating fins 41 are stood at predetermined intervals on the top of a base plate 42. As shown in FIG. 24, each individual radiating fin 41 has corrugations 41a provided on both sides thereof. With this arrangement, the heat radiation area of each individual radiating fin 41 is increased.

Figure 25:
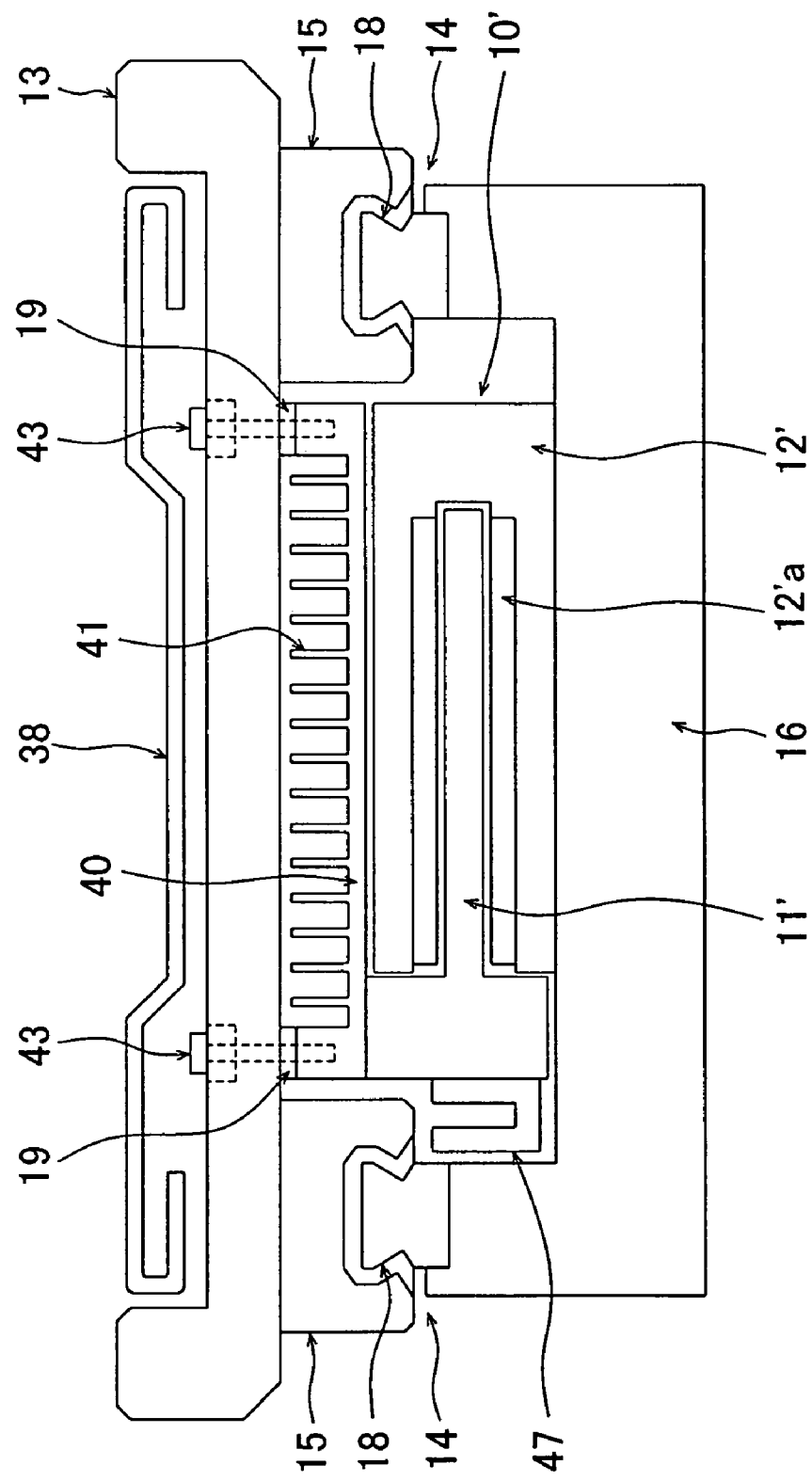
FIG. 25 is a diagram showing a structural example of the drive guide apparatus according to the present invention.

FIG. 25 is a diagram showing a specific structural example of the drive guide apparatus according to the present invention. The illustrated drive guide apparatus is approximately the same as the drive guide apparatus shown in FIG. 22 in terms of the arrangement. The drive guide apparatus differs from the latter in the material constituting the thermal insulators 19 interposed between the table 13 and the finned heatsink 40 and in the structure for connecting together the table 13 and the finned heatsink 40.

The thermal insulators 19 in this example absorb a deformation of the finned heatsink 40 due to thermal expansion to prevent deformation of the primary side (moving element) 11' of the linear motor 10' that is connected to the finned heatsink 40.

Because the finned heatsink 40 is secured to the table 13, when it thermally expands, the finned heatsink 40 is curvedly deformed owing to a thermal expansion difference therebetween.

The deformation of the finned heatsink 40 causes the primary side (moving element) 11' of the linear motor 10' to be displaced. Consequently, the gap between the primary side 11' and the secondary side (stator) 12' changes. This exerts an influence upon the characteristics of the linear motor 10'.

Figure 26A:
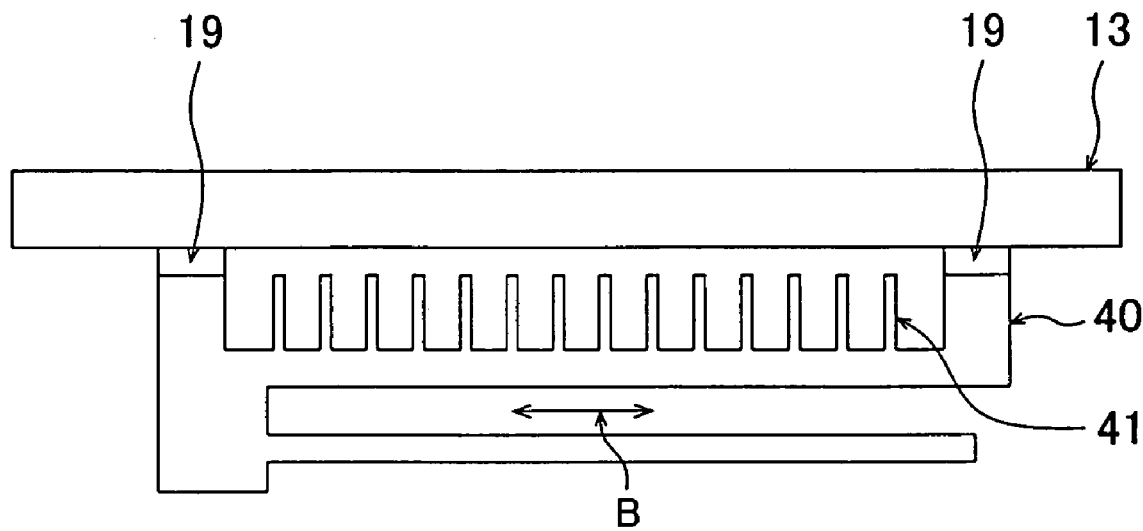
FIG. 26 is a diagram showing the relationship between the table and the heatsink that varies in response to a temperature rise in the drive guide apparatus according to the present invention.
Figure 26B:
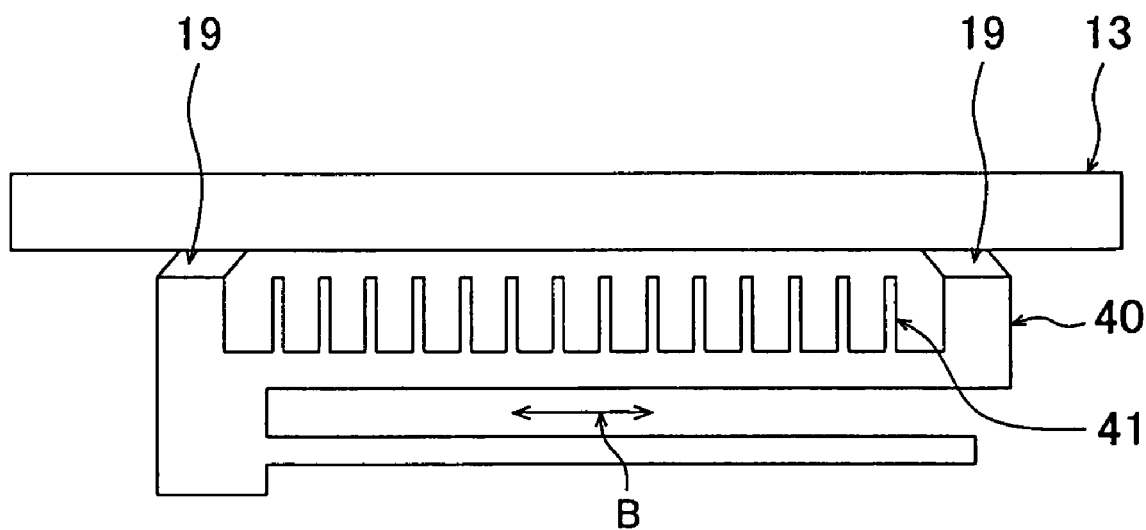
Figure 27:
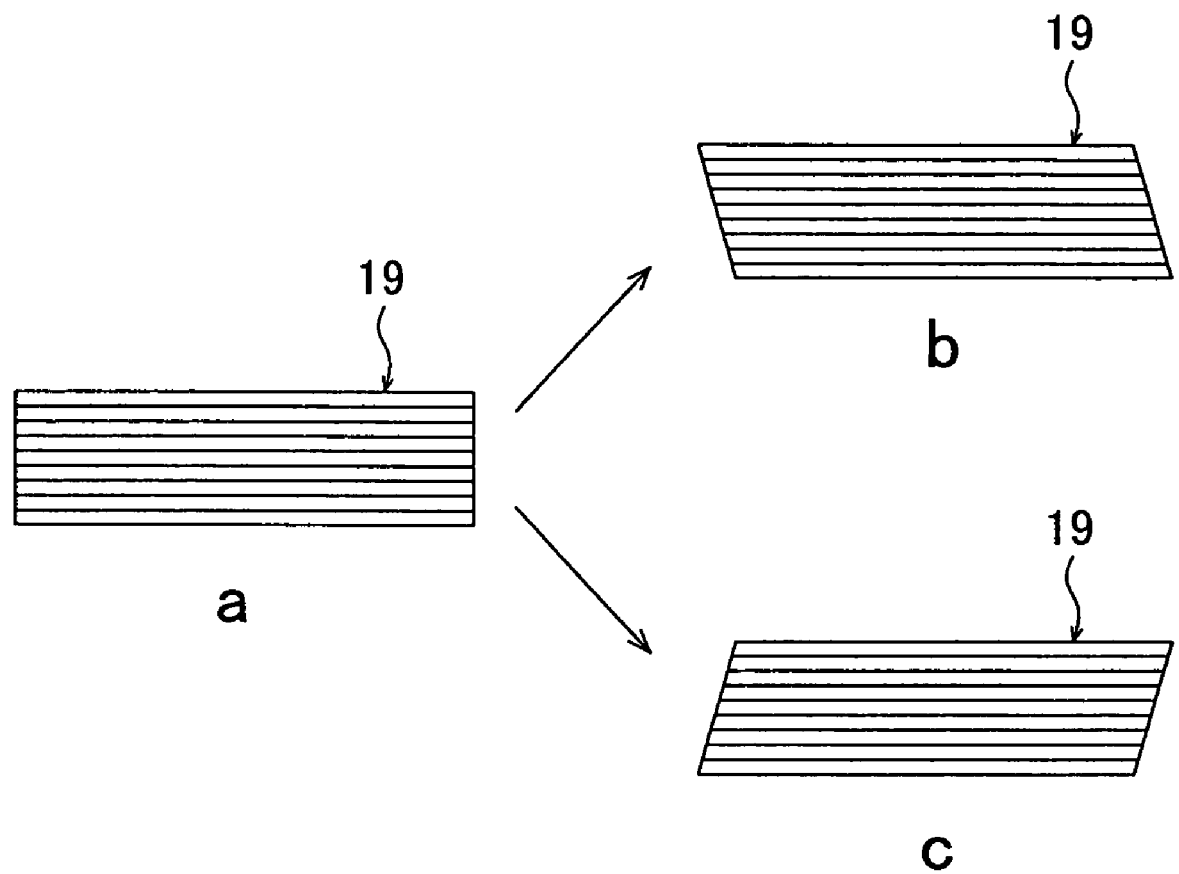
FIG. 27 is a diagram for explaining the deformation of a thermal insulator.

In this example, when the finned heatsink 40 thermally expands in the directions shown by the double-headed arrow B in FIG. 26A, shearing force acts on the thermal insulators 19 at both sides of the finned heatsink 40. In such a case, the thermal insulators 19 are deformed as shown in FIG. 26B, thereby absorbing the deformation of the finned heatsink 40 due to the thermal expansion. That is, the thermal insulators 19 are deformed from the shape shown in (a) of FIG. 27 to the respective shapes as shown in (b) and (c) of FIG. 27, thereby absorbing the deformation of the finned heatsink 40.

Thus, the deformation of the finned heatsink 40 disappears. Therefore, there is no change in the gap dimension between the primary side 11' and the secondary side (stator) 12' of the linear motor 10'. Accordingly, no influence is exerted upon the characteristics of the linear motor 10'. For the thermal insulators 19, a material that has excellent thermal insulating properties and that is easily deformable by shearing force (i.e. a material easy to deform in the width direction and rigid in the thickness direction) is used. For example, a laminated glass-epoxy resin material is suitably used for the thermal insulators 19 because it is excellent in thermal insulating performance and easily deformable by shearing force.

Figure 28:
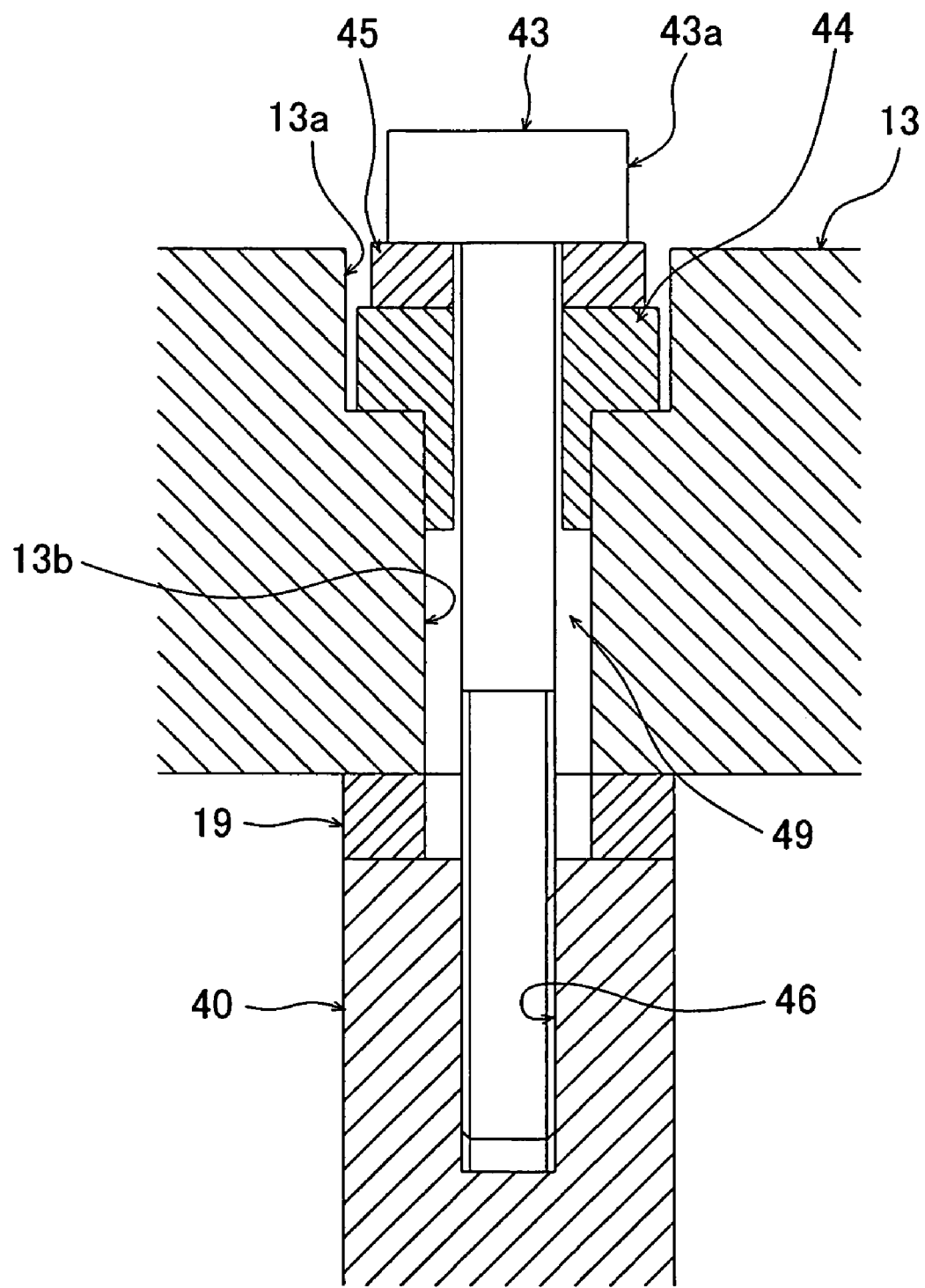
FIG. 28 is a diagram showing the joint structure of the table and the heatsink in the drive guide apparatus according to the present invention.

The finned heatsink 40 is fastened to the table 13 with the thermal insulators 19 interposed therebetween by using bolts 43. FIG. 28 is a diagram showing a fastening structure using bolts 43.

As shown in the figure, a spot-faced hole 13a is provided in a portion of the top of the table 13 at which a bolt 43 extends through the table 13. The spot-faced hole 13a has a flanged cylindrical member 44 and a washer 45 inserted therein. The bolt 43 extends through the flanged cylindrical member 44 and the washer 45 and engages a threaded hole 46 provided in the finned heatsink 40. That is, the finned heatsink 40 is fastened to the table 13 with the bolts 43 in a state where the thermal insulators 19 are interposed between the finned heatsink 40 and the table 13 and the flange of the cylindrical member 44 and the washer 45 are interposed between the head 43a of the bolt 43 and the table 13.

The finned heatsink 40 is fastened at both sides thereof with the same fastening structure using the bolts 43. It should be noted that a gap 49 is provided between the outer peripheral portion of the bolt 43 and the inner wall surface of a bolt receiving hole 13b to prevent heat from the finned heatsink 40 from being transferred to the table 13 from the outer peripheral portion of the bolt 43.

Figure 29:
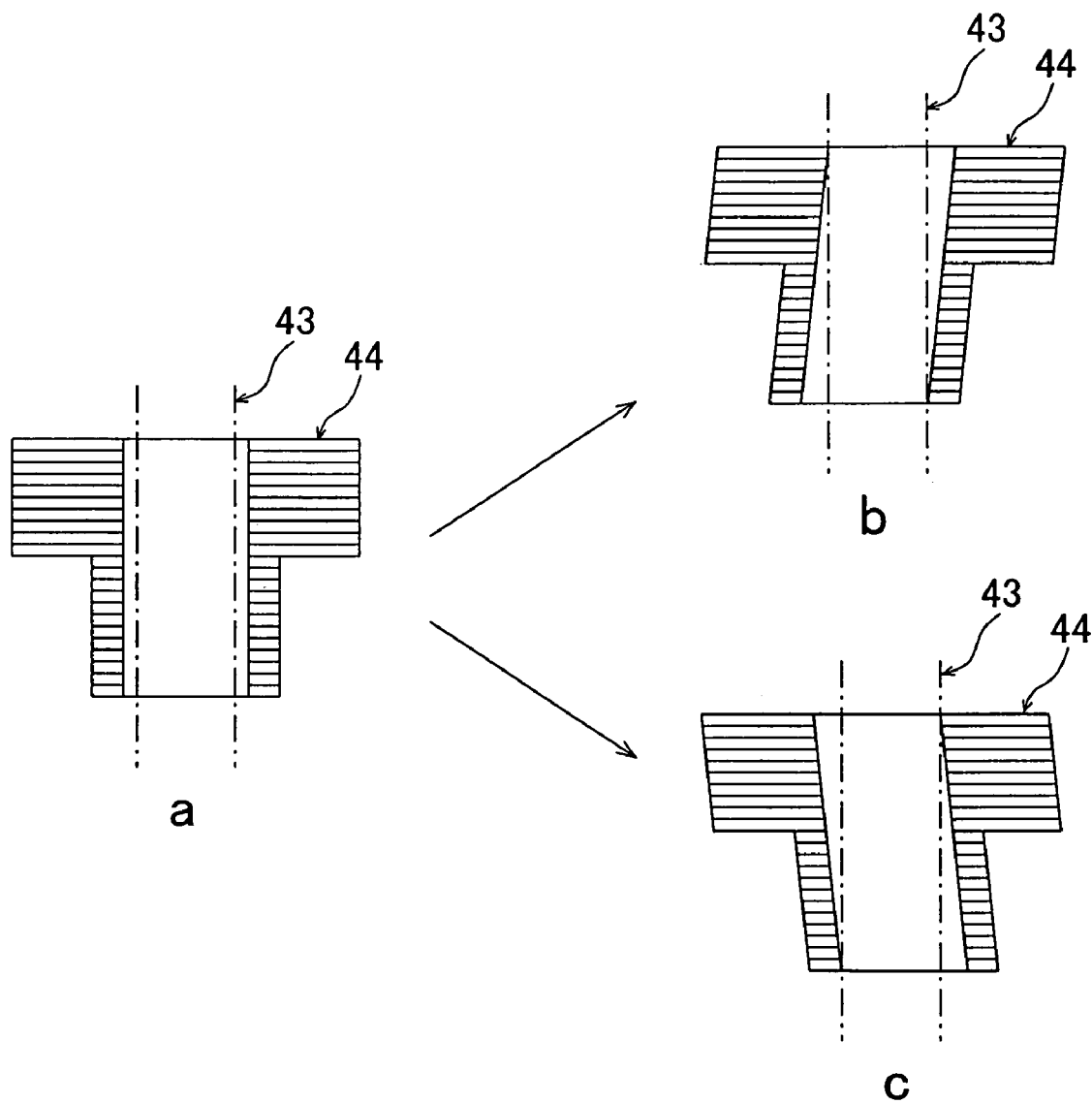
FIG. 29 is a diagram for explaining the deformation of a flanged cylindrical member.

The flanged cylindrical member 44 uses a material excellent in thermal insulating performance and easily deformable by shearing force (e.g. laminated glass-epoxy resin material) as in the case of the thermal insulators 19. Thus, when the finned heatsink 40 thermally expands owing to a rise in temperature, the thermal expansion of the finned heatsink 40 is absorbed by deformation of the thermal insulators 19 as stated above and further by deformation of the flanged cylindrical members 44 from the shape shown in (a) of FIG. 29 to the respective shapes as shown in (b) and (c) of FIG. 29. Accordingly, the finned heatsink 40 will not be curvedly deformed even if it thermally expands owing to a rise in temperature.

Although heat from the finned heatsink 40 is transferred to the bolts 43, there is no possibility of the heat being transferred to the table 13 because the flanged cylindrical members 44, which are excellent in thermal insulating performance, are interposed between the bolts 43 and the table 13.

Figure 30:
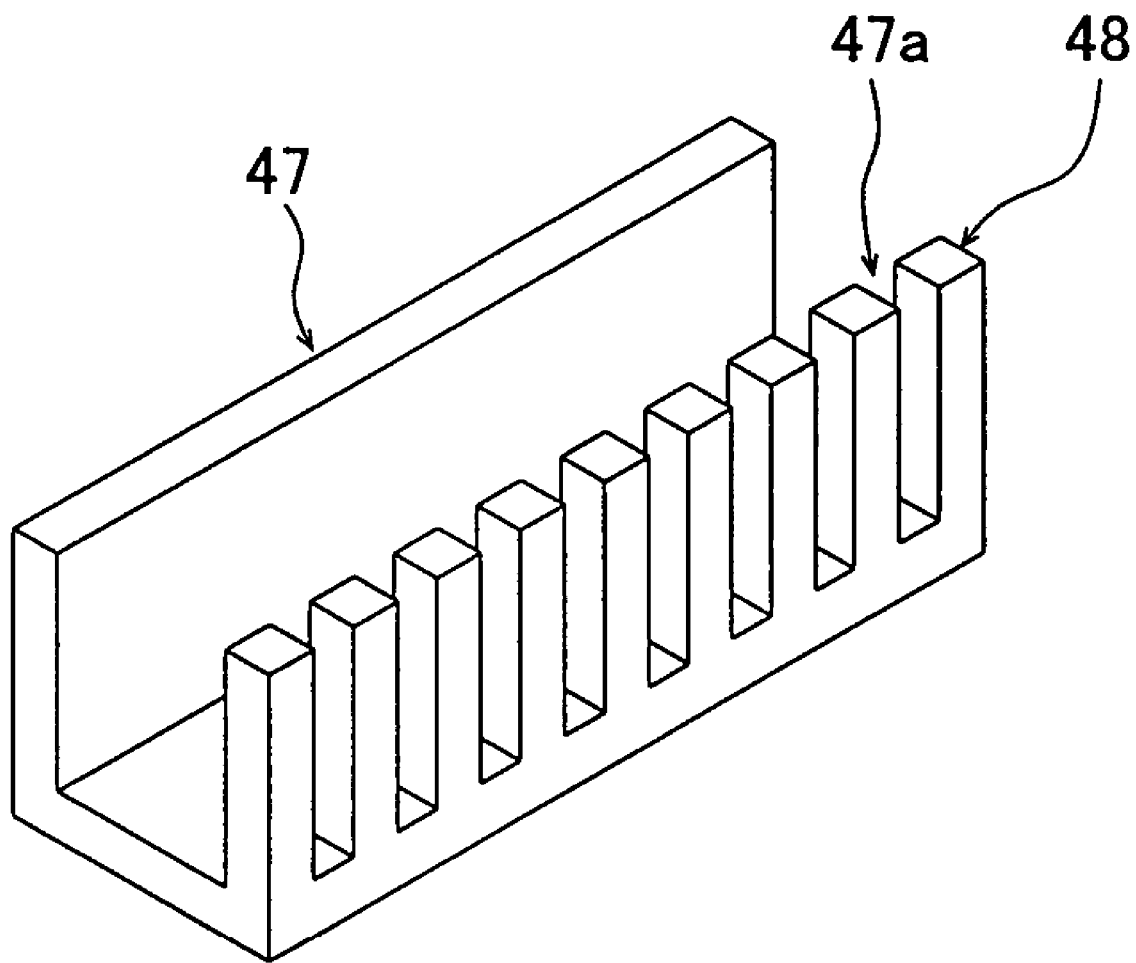
FIG. 30 is a diagram showing a structural example of the heatsink.

In this drive guide apparatus, as shown in FIG. 25, a heatsink 47 is attached to an end portion of the primary side of the linear motor 10'. As shown in FIG. 30, the heatsink 47 has a U-shaped sectional configuration. One wall of the U-shaped structure of the heatsink 47 is provided with a multiplicity of slits 47a at predetermined intervals, thereby providing radiating fins 48. The effect of dissipating heat from the primary side of the linear motor 10' is further improved by providing the heatsink 47 arranged as stated above on the end portion of the primary side of the linear motor 10'.

INDUSTRIAL APPLICABILITY

As has been stated above, according to the invention recited in claim 1, thermal insulating means for blocking heat generated from the primary side of the linear motor is provided between the primary side of the linear motor and the rail or the moving member of the guide mechanism to which the primary side of the linear motor is connected. Therefore, heat generated from the primary side of the linear motor is prevented from being transferred to the rail or the moving member of the guide mechanism. Consequently, thermal expansion of the rail or the moving member is prevented, and there is no variation in rolling resistance or sliding resistance of the guide mechanism. Accordingly, it is possible to ensure an increased lifetime for the drive guide apparatus.

According to the invention recited in claim 2, the thermal insulating means comprises a thermal insulator interposed between the rail or the moving member and the primary side of the linear motor. Thus, an increased lifetime can be ensured for the drive guide apparatus with a simple arrangement.

According to the invention recited in claim 3, the thermal insulator is elongated in the direction of relative movement between the rail and the moving member. By doing so, rigidity in this direction increases. Thus, undesired oscillation phenomena can be prevented.

According to the invention recited in claim 4, the thermal insulating means comprises a thermal insulating space formed between the rail or the moving member and the primary side of the linear motor. With this arrangement, it is possible to cut off the transfer of radiation heat from the primary side of the linear motor. Therefore, it is possible to prevent thermal expansion of the rail or the moving member due to radiation heat and hence possible to eliminate variation in rolling resistance or sliding resistance of the guide mechanism. Accordingly, an increased lifetime can be ensured for the drive guide apparatus as in the case of the above.

According to the invention recited in claim 5, the thermal insulating space has a mirror finished surface at a side thereof closer to the rail or the moving member of the guide mechanism to which the primary side of the linear motor is connected. With this arrangement, the transfer of radiation heat from the primary side of the linear motor can be cut off even more effectively.

According to the invention recited in claim 6, the guide mechanism is arranged in the form of a rolling guide. That is, the rail is formed with a rolling element rolling surface extending longitudinally of the rail. The moving member has an endless recirculation passage including a load rolling element rolling passage corresponding to the rolling element rolling surface. A multiplicity of rolling elements are arranged and accommodated in the endless recirculation passage. The rolling elements recirculate through the endless recirculation passage while receiving a load in the load rolling element rolling passage. In the rolling guide according to this invention, the preload applied to the rolling elements is not varied by a stress generated by thermal expansion of the rail or the moving member. Accordingly, smooth rolling of the rolling elements is ensured, so that an increased lifetime of the drive guide apparatus is attained. In the rolling guide, if the preload increases, flaking (a phenomenon in which the surface of the raceway surface or the rolling element surface peels off in flakes owing to the rolling fatigue of the material) is likely to occur. If flaking occurs, the lifetime reduces markedly.

According to the invention recited in claim 7, a heatsink is provided to dissipate heat generated from the primary side of the linear motor. With this arrangement, heat generated from the primary side of the linear motor can be dissipated efficiently. Therefore, the transfer of the heat to the rail or the moving member of the guide mechanism is further retarded. As a result, restrictions on the linear motor configuration for heat dissipation are reduced. Accordingly, it is possible to employ a linear motor having an arrangement even more suitable for the drive guide apparatus.

According to the invention recited in claim 8, the heatsink is a finned heatsink having radiating fins. By using the finned heatsink, the heat dissipation effect is further enhanced. Accordingly, the transfer of heat to the rail or the moving member of the guide mechanism is further retarded.

According to the invention recited in claim 9, when the heatsink is thermally expanded and deformed by heat from the primary side of the linear motor, shearing force acts on the absorbing member. Consequently, the absorbing member is shear-deformed to absorb the deformation of the heatsink. Therefore, the heatsink is not deformed, and the primary side of the linear motor is not displaced. Accordingly, there is no change in the gap between the primary side and the secondary side of the linear motor. Hence, there is no change in characteristics of the linear motor.

According to the invention recited in claim 10, the absorbing member has both the function of absorbing a deformation of the heatsink by shear deformation and the thermal insulating function of cutting off the heat transfer from the heatsink to the moving member. Therefore, no influence is exerted upon the characteristics of the linear motor as stated above. Moreover, there is no variation in rolling resistance or sliding resistance of the guide mechanism. Accordingly, it is possible to ensure an increased lifetime for the drive guide apparatus.

According to the invention recited in claim 11, a laminated glass-epoxy resin material is used for the absorbing member. By doing so, a deformation of the heatsink is absorbed easily. That is, the laminated glass-epoxy resin material exhibits strong rigidity in the lamination direction (thickness direction) and weak rigidity in a direction (width direction) perpendicular to the lamination direction. Therefore, when the heatsink thermally expands in response to a rise in temperature, shearing force acts on the absorbing member. At this time, the absorbing member is easily deformed to absorb the deformation of the heatsink. Accordingly, it is possible to ensure an increased lifetime for the drive guide apparatus.

What is claimed is:

1. A drive guide apparatus having a linear motor and a guide mechanism that guides relative movement between a primary side of said linear motor, which is an energized side thereof, and a secondary side of said linear motor, which is a non-energized side thereof, and that carries a load, said guide mechanism having a rail and a moving member provided to be movable relative to said rail, the primary side of said linear motor being connected directly or indirectly to the rail or the moving member of said guide mechanism, wherein thermal insulating means for blocking heat generated from the primary side of said linear motor is provided between said primary side and the rail or the moving member of said guide mechanism to which said primary side is connected, wherein a heatsink that dissipates heat generated from the primary side of said linear motor is provided.

2. A drive guide apparatus according to claim 1, wherein said heatsink is a finned heatsink having radiating fins.

* * * * *